(12) United States Patent
Sweeney et al.

(10) Patent No.: US 9,361,365 B2
(45) Date of Patent: Jun. 7, 2016

(54) METHODS AND APPARATUS FOR SEARCHING OF CONTENT USING SEMANTIC SYNTHESIS

(75) Inventors: Peter J. Sweeney, Kitchener (CA); Robert Charles Good, Waterloo (CA)

(73) Assignee: Primal Fusion Inc., Kitchener (CA)

( * ) Notice: Subject to any disclaimer, the term of this patent is extended or adjusted under 35 U.S.C. 154(b) by 488 days.

(21) Appl. No.: 13/162,069

(22) Filed: Jun. 16, 2011

(65) Prior Publication Data

US 2011/0314006 A1 Dec. 22, 2011

Related U.S. Application Data

(63) Continuation-in-part of application No. 12/671,846, filed as application No. PCT/CA2009/000567 on May 1, 2009.

(60) Provisional application No. 61/049,581, filed on May 1, 2008, provisional application No. 61/357,512, filed on Jun. 22, 2010, provisional application No. 61/430,141, filed on Jan. 5, 2011, provisional application No. 61/430,143, filed on Jan. 5, 2011, provisional application No. 61/430,138, filed on Jan. 5, 2011.

(51) Int. Cl.
*G06F 17/30* (2006.01)
*G06F 17/27* (2006.01)

(52) U.S. Cl.
CPC ...... *G06F 17/30663* (2013.01); *G06F 17/2785* (2013.01); *G06F 17/30734* (2013.01)

(58) Field of Classification Search
USPC .......................................................... 706/12
See application file for complete search history.

(56) References Cited

U.S. PATENT DOCUMENTS

| 3,943,462 A | 3/1976 | Thompson |
| 4,532,813 A | 8/1985 | Rinehart |
| 4,972,328 A | 11/1990 | Wu et al. |
| 5,056,021 A | 10/1991 | Ausborn |

(Continued)

FOREIGN PATENT DOCUMENTS

| CA | WO 2005020094 A1 * | 3/2005 | ........ G06F 17/30867 |
| CA | 2734756 A1 | 3/2010 | |

(Continued)

OTHER PUBLICATIONS

Sussna, "Word sense disambiguation for free-text indexing using a massive semantic network", Proceedings, the Second International Conference on Information and Knowledge Management, 1993, pp. 67-74.*

(Continued)

*Primary Examiner* — Kakali Chaki
*Assistant Examiner* — Fuming Wu
(74) *Attorney, Agent, or Firm* — Wolf, Greenfield & Sacks, P.C.

(57) ABSTRACT

A method of semantic searching. The method may include receiving a first search query, obtaining a disambiguation term for semantically disambiguating the first search query, and creating, with a processor, a second search query based at least in part on the first search query and the disambiguation term. The method may also include at least one of outputting search results obtained from a search conducted based at least in part on the second search query and sending the second search query to a search service for outputting search results.

12 Claims, 13 Drawing Sheets

(56) References Cited

U.S. PATENT DOCUMENTS

| | | | |
|---|---|---|---|
| 5,193,185 A | 3/1993 | Lanter | |
| 5,369,763 A | 11/1994 | Biles | |
| 5,745,910 A | 4/1998 | Piersol et al. | |
| 5,793,376 A | 8/1998 | Tanaka et al. | |
| 5,794,050 A * | 8/1998 | Dahlgren | G06F 17/271 707/E17.074 |
| 5,822,731 A * | 10/1998 | Schultz | G06F 17/30997 704/240 |
| 5,835,758 A | 11/1998 | Nochur et al. | |
| 5,911,145 A | 6/1999 | Arora et al. | |
| 5,937,400 A | 8/1999 | Au | |
| 5,953,726 A | 9/1999 | Carter et al. | |
| 6,006,222 A | 12/1999 | Culliss | |
| 6,078,916 A | 6/2000 | Culliss | |
| 6,098,033 A | 8/2000 | Richardson et al. | |
| 6,138,085 A | 10/2000 | Richardson et al. | |
| 6,167,390 A | 12/2000 | Brady et al. | |
| 6,173,276 B1 | 1/2001 | Kant et al. | |
| 6,233,575 B1 | 5/2001 | Agrawal et al. | |
| 6,292,792 B1 | 9/2001 | Baffes et al. | |
| 6,295,066 B1 | 9/2001 | Tanizaki et al. | |
| 6,334,131 B2 | 12/2001 | Chakrabarti et al. | |
| 6,349,275 B1 | 2/2002 | Schumacher et al. | |
| 6,356,899 B1 | 3/2002 | Chakrabarti et al. | |
| 6,396,864 B1 | 5/2002 | O'Brien et al. | |
| 6,401,061 B1 | 6/2002 | Zieman | |
| 6,460,029 B1 * | 10/2002 | Fries | G06F 17/30654 |
| 6,499,024 B1 | 12/2002 | Stier et al. | |
| 6,539,376 B1 | 3/2003 | Sundaresan et al. | |
| 6,539,395 B1 | 3/2003 | Gjerdingen et al. | |
| 6,556,983 B1 | 4/2003 | Altschuler et al. | |
| 6,571,240 B1 | 5/2003 | Ho et al. | |
| 6,694,329 B2 | 2/2004 | Murray | |
| 6,751,611 B2 | 6/2004 | Krupin et al. | |
| 6,751,621 B1 * | 6/2004 | Calistri-Yeh | G06F 17/30731 |
| 6,768,982 B1 | 7/2004 | Collins et al. | |
| 6,772,136 B2 | 8/2004 | Kant et al. | |
| 6,785,683 B1 | 8/2004 | Yaeli et al. | |
| 6,868,525 B1 | 3/2005 | Szabo | |
| 6,976,020 B2 | 12/2005 | Anthony et al. | |
| 6,980,984 B1 | 12/2005 | Huffman et al. | |
| 7,007,074 B2 | 2/2006 | Radwin | |
| 7,035,864 B1 | 4/2006 | Ferrari et al. | |
| 7,051,023 B2 | 5/2006 | Kapur et al. | |
| 7,062,466 B2 | 6/2006 | Wagner et al. | |
| 7,062,483 B2 | 6/2006 | Ferrari et al. | |
| 7,089,237 B2 | 8/2006 | Turnbull et al. | |
| 7,120,646 B2 | 10/2006 | Streepy, Jr. | |
| 7,152,065 B2 | 12/2006 | Behrens et al. | |
| 7,181,465 B2 | 2/2007 | Maze et al. | |
| 7,209,922 B2 | 4/2007 | Maze et al. | |
| 7,225,183 B2 | 5/2007 | Gardner | |
| 7,240,049 B2 * | 7/2007 | Kapur | G06F 17/30867 |
| 7,249,117 B2 | 7/2007 | Estes | |
| 7,280,991 B1 | 10/2007 | Beams et al. | |
| 7,283,992 B2 | 10/2007 | Liu et al. | |
| 7,299,247 B2 * | 11/2007 | Calistri-Yeh | G06F 17/30731 |
| 7,302,418 B2 | 11/2007 | Asahara | |
| 7,319,951 B2 | 1/2008 | Rising, III et al. | |
| 7,392,250 B1 | 6/2008 | Dash et al. | |
| 7,406,456 B2 * | 7/2008 | Calistri-Yeh | G06F 17/30731 704/9 |
| 7,418,452 B2 | 8/2008 | Maze | |
| 7,440,940 B2 | 10/2008 | Chen et al. | |
| 7,444,356 B2 * | 10/2008 | Calistri-Yeh | G06F 17/30731 |
| 7,478,089 B2 | 1/2009 | Henkin et al. | |
| 7,490,073 B1 | 2/2009 | Qureshi et al. | |
| 7,493,319 B1 | 2/2009 | Dash et al. | |
| 7,496,593 B2 | 2/2009 | Gardner et al. | |
| 7,502,810 B2 | 3/2009 | Acevedo-Aviles et al. | |
| 7,558,778 B2 * | 7/2009 | Carus | G06N 99/005 |
| 7,580,918 B2 | 8/2009 | Chang et al. | |
| 7,596,374 B2 | 9/2009 | Katou | |
| 7,596,574 B2 | 9/2009 | Sweeney | |
| 7,606,168 B2 | 10/2009 | Robinson et al. | |
| 7,606,781 B2 | 10/2009 | Sweeney et al. | |
| 7,627,582 B1 | 12/2009 | Ershov | |
| 7,668,737 B2 | 2/2010 | Streepy, Jr. | |
| 7,685,118 B2 * | 3/2010 | Zhang | G06F 17/30734 706/45 |
| 7,711,672 B2 | 5/2010 | Au | |
| 7,716,207 B2 | 5/2010 | Odom et al. | |
| 7,716,216 B1 | 5/2010 | Harik et al. | |
| 7,720,857 B2 | 5/2010 | Beringer et al. | |
| 7,752,199 B2 | 7/2010 | Farrell | |
| 7,752,534 B2 | 7/2010 | Blanchard, III et al. | |
| 7,827,125 B1 | 11/2010 | Rennison | |
| 7,844,565 B2 | 11/2010 | Sweeney | |
| 7,849,090 B2 | 12/2010 | Sweeney | |
| 7,860,817 B2 | 12/2010 | Sweeney et al. | |
| 7,945,555 B2 | 5/2011 | Sankaran et al. | |
| 7,970,764 B1 | 6/2011 | Ershov | |
| 8,010,570 B2 | 8/2011 | Sweeney | |
| 8,024,331 B2 * | 9/2011 | Calistri-Yeh | G06F 17/30731 704/9 |
| 8,281,238 B2 | 10/2012 | Sweeney et al. | |
| 2002/0069197 A1 | 6/2002 | Katayama et al. | |
| 2002/0078044 A1 | 6/2002 | Song et al. | |
| 2002/0133483 A1 | 9/2002 | Klenk et al. | |
| 2002/0194187 A1 | 12/2002 | McNeil et al. | |
| 2003/0177112 A1 | 9/2003 | Gardner | |
| 2003/0196094 A1 | 10/2003 | Hillis et al. | |
| 2003/0217023 A1 | 11/2003 | Cui et al. | |
| 2003/0217052 A1 * | 11/2003 | Rubenczyk | G06F 17/30643 |
| 2003/0217335 A1 | 11/2003 | Chung et al. | |
| 2004/0024739 A1 | 2/2004 | Copperman et al. | |
| 2004/0049522 A1 | 3/2004 | Streepy, Jr. | |
| 2004/0193414 A1 * | 9/2004 | Calistri-Yeh | G06F 17/30731 704/245 |
| 2005/0010428 A1 | 1/2005 | Bergeron et al. | |
| 2005/0065955 A1 | 3/2005 | Babikov et al. | |
| 2005/0086188 A1 | 4/2005 | Hillis et al. | |
| 2005/0149518 A1 | 7/2005 | Duan et al. | |
| 2005/0154708 A1 | 7/2005 | Sun | |
| 2005/0209874 A1 | 9/2005 | Rossini | |
| 2005/0216335 A1 | 9/2005 | Fikes et al. | |
| 2005/0223109 A1 | 10/2005 | Mamou et al. | |
| 2005/0289524 A1 | 12/2005 | McGinnes | |
| 2006/0010117 A1 | 1/2006 | Bonabeau et al. | |
| 2006/0026147 A1 | 2/2006 | Cone et al. | |
| 2006/0047632 A1 * | 3/2006 | Zhang | G06F 17/30734 |
| 2006/0053172 A1 | 3/2006 | Gardner et al. | |
| 2006/0074980 A1 | 4/2006 | Sarkar | |
| 2006/0085489 A1 | 4/2006 | Tomic et al. | |
| 2006/0129906 A1 | 6/2006 | Wall | |
| 2006/0153083 A1 | 7/2006 | Wallenius | |
| 2006/0195407 A1 | 8/2006 | Athelogou et al. | |
| 2006/0242564 A1 | 10/2006 | Egger et al. | |
| 2006/0271520 A1 | 11/2006 | Ragan | |
| 2007/0033531 A1 | 2/2007 | Marsh | |
| 2007/0036440 A1 | 2/2007 | Schaepe et al. | |
| 2007/0038500 A1 | 2/2007 | Hammitt et al. | |
| 2007/0061195 A1 | 3/2007 | Liu et al. | |
| 2007/0078889 A1 | 4/2007 | Hoskinson | |
| 2007/0083492 A1 | 4/2007 | Hohimer et al. | |
| 2007/0094221 A1 | 4/2007 | Au | |
| 2007/0094247 A1 * | 4/2007 | Chowdhury | G06F 17/30864 |
| 2007/0106499 A1 * | 5/2007 | Dahlgren | G06F 17/30401 704/10 |
| 2007/0106658 A1 | 5/2007 | Ferrari et al. | |
| 2007/0118542 A1 | 5/2007 | Sweeney | |
| 2007/0136221 A1 | 6/2007 | Sweeney et al. | |
| 2007/0143300 A1 | 6/2007 | Gulli et al. | |
| 2007/0174041 A1 | 7/2007 | Yeske | |
| 2007/0192272 A1 | 8/2007 | Elfayoumy et al. | |
| 2007/0203865 A1 | 8/2007 | Hirsch | |
| 2007/0208719 A1 | 9/2007 | Tran | |
| 2007/0208764 A1 | 9/2007 | Grisinger | |
| 2007/0226198 A1 * | 9/2007 | Kapur | G06F 17/30867 |
| 2007/0288503 A1 | 12/2007 | Taylor | |
| 2007/0294200 A1 | 12/2007 | Au | |
| 2007/0300142 A1 | 12/2007 | King et al. | |
| 2008/0001948 A1 | 1/2008 | Hirsch | |
| 2008/0004864 A1 | 1/2008 | Gabrilovich et al. | |

(56) References Cited

U.S. PATENT DOCUMENTS

| | | |
|---|---|---|
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1* | 11/2008 | Calistri-Yeh ...... G06F 17/30731 |
| 2008/0294584 A1 | 11/2008 | Herz |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0132442 A1* | 5/2009 | Subramaniam ..... G10L 15/1822 706/12 |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1* | 9/2010 | Sweeney .................. G06N 5/02 706/12 |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0314006 A1* | 12/2011 | Sweeney ............. G06F 17/2785 707/723 |
| 2011/0314382 A1 | 12/2011 | Sweeney |
| 2011/0320396 A1* | 12/2011 | Hunt ........................ G06N 5/02 706/47 |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2013/0164732 A1* | 6/2013 | Sutovsky ............. A01N 1/0226 435/2 |
| 2013/0165423 A1* | 6/2013 | Leleti ................... C07D 401/14 514/210.18 |

FOREIGN PATENT DOCUMENTS

| | | |
|---|---|---|
| CN | 1395193 A | 5/2003 |
| EP | 0 962 873 A1 | 12/1999 |
| JP | 8-171569 A | 7/1996 |
| JP | 2005-276115 A | 10/2005 |
| JP | 2007-511016 A | 4/2007 |
| JP | 2007-328713 A | 12/2007 |
| JP | 2008-509458 A | 3/2008 |
| JP | 2008-102737 A | 5/2008 |
| JP | 2009-116469 A | 5/2009 |
| WO | WO 02/054292 A2 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2005020094 A1 * | 3/2005 ............. G06F 17/30 |
| WO | WO 2007/047971 A2 | 4/2007 |
| WO | WO 2008/025167 A1 | 3/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Pedersen et al., "Maximizing Semantic Relatedness to Perform Word Sense Disambiguation", Supercomputing Institute, University of Minnesota, 2005.*

M. Sussna, "Word sense disambiguation for free-text indexing using a massive semantic network", Proceedings, the Second International Conference on Information and Knowledge Management, 1993, pp. 67-74.*

Khoo et al., "Semantic Relations in Information Science", Annual Review of Information Science and Technology, 40, pp. 157-228, 2006.*

Tsatsaronis et al., "Word Sense Disambiguation with Semantic Networks", Proceedings, the second international conference on Information and knowledge management (CIKM '93), pp. 67-74, ACM New York, NY, USA 1993.*

International Preliminary Report on Patentability for International Application No. PCT/CA2011/000718 mailed Jan. 10, 2013.

International Search Report dated Aug. 13, 2009 for International Application No. PCT/CA2009/000567 (3 pages).

Chinese Office Action for Chinese Application No. 200780032062.9, Issued May 17, 2011.

International Search Report and Written Opinion for PCT/CA2007/001546 dated Dec. 28, 2007.

International Preliminary Report on Patentability for PCT/CA2007/001546 dated Dec. 19, 2008.

International Search Report and Written Opinion for PCT/CA2009/000567 mailed Aug. 24, 2009.

International Preliminary Report on Patentability for PCT/CA2009/000567 mailed Nov. 11, 2010.

(56) References Cited

OTHER PUBLICATIONS

International Search Report and Written Opinion for PCT/CA2009/001185 mailed Dec. 3, 2009.
International Preliminary Report on Patentability for PCT/CA2009/001185 mailed Mar. 10, 2011.
International Search Report and Written Opinion for PCT/CA2010/001382 mailed Jan. 13, 2011.
International Preliminary Report on Patentability for PCT/CA2010/001382 mailed Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 mailed Oct. 13, 2011.
International Search Report and Written Opinion for PCT/CA2011/000719 mailed Sep. 28, 2011.
International Search Report and Written Opinion for PCT/CA2011/000745 mailed Sep. 22, 2011.
International Search Report and Written Opinion for PCT/CA2011/001382 mailed Apr. 24, 2012.
International Search Report and Written Opinion for PCT/CA2011/001402, mailed Apr. 24, 2012.
International Search Report and Written Opinion for PCT/CA2011/001403 mailed May 23, 2012.
International Search Report and Written Opinion for PCT/CA2012/000007 mailed Apr. 20, 2012.
International Search Report and Written Opinion for PCT/CA2012/000009 mailed May 1, 2012.
Office Action for U.S. Appl. No. 11/625,452 mailed Mar. 30, 2009.
Office Action for U.S. Appl. No. 11/625,452 mailed Dec. 7, 2009.
Office Action for U.S. Appl. No. 11/625,452 mailed Mar. 26, 2010.
Office Action for U.S. Appl. No. 12/477,994 mailed Aug. 31, 2010.
Office Action for U.S. Appl. No. 12/477,977 mailed Sep. 28, 2010.
Office Action for U.S. Appl. No. 11/469,258 mailed Aug. 21, 2008.
Interview Summary for U.S. Appl. No. 11/469,258 mailed Dec. 16, 2008.
Office Action for U.S. Appl. No. 11/550,457 mailed Dec. 15, 2008.
Office Action for U.S. Appl. No. 12/556,349 mailed Jun. 29, 2010.
Office Action for U.S. Appl. No. 12/441,100 mailed Jun. 9, 2011.
Office Action for U.S. Appl. No. 12/441,100 mailed Jan. 24, 2012.
Advisory Action for U.S. Appl. No. 12/441,100 mailed May 4, 2012.
Office Action for U.S. Appl. No. 12/549,812 mailed Oct. 1, 2012.
Office Action for U.S. Appl. No. 12/555,222 nailed Jan. 27, 2012.
Office Action for U.S. Appl. No. 12/555,222 mailed Oct. 31, 2012.
Office Action for U.S. Appl. No. 12/555,341 mailed Feb. 9, 2012.
Office Action for U.S. Appl. No. 12/555,341 mailed Aug. 1, 2012.
Office Action for U.S. Appl. No. 12/615,703 mailed Feb. 1, 2012.
Office Action for U.S. Appl. No. 13/105,890 mailed Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.

Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilisitc justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998;1398:4-15.
Ma et al., Semantic Information Extraction of Video Based on Ontology and Inference. ICSC 2007. International Conference on Semantic Computing. 2007;1:721-726. Digital Object Identifier: 10.1109/ICSC.2007.12.
Metzler et al., A markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artifical Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.
Terra et al., Frequency estimates for statistical word similarity measures. Proceedings of 2003 Conference of the North American Chapter of the Association for Computational Linguistics on Human Language Technology. 2003:165-172.

(56) References Cited

OTHER PUBLICATIONS

Wang et al., Gene expression correlation and gene ontology-based similarity: An assesment of quantitative relationships. Proceedings of IEEE Symposium on Computational Intelligence in Bioinformatics and Computational Biology. 2004:25-31.

Wu et al., Interpreting tf-idf term weights as making relevance decisions. ACM Transactions on Information Systems. 2008;26(3):Article No. 13.

Zhai, Statistical language models for information retrieval—a critical review. Foundations and Trends in Information Retrieval. 2008;2(3):137-213.

Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.

Australian Office Action for Australian Application No. 2011269675 dated Dec. 2, 2014.

Japanese Office Action for Japanese Application No. 2013-515642 mailed Jan. 27, 2015.

Japanese Office Action for Japanese Application No. 2013-515642 mailed Dec. 15, 2015.

* cited by examiner

METHODS AND APPARATUS FOR SEARCHING OF CONTENT USING SEMANTIC SYNTHESIS

CROSS-REFERENCE TO RELATED APPLICATIONS

The present application claims the benefit under 35 U.S.C. §119(e) of U.S. Provisional Application Ser. No. 61/357,512, filed on Jun. 22, 2010, titled "Methods and Apparatus for Searching of Content Using Semantic Synthesis," and of U.S. Provisional Application Ser. No. 61/430,138, filed Jan. 5, 2011, titled "Method and Apparatus for Presenting Concepts Related to an Active Concept," and of U.S. Provisional Application Ser. No. 61/430,141, filed Jan. 5, 2011, titled "Methods and Apparatus for Identifying Terms for Monetization," and of U.S. Provisional Application Ser. No. 61/430,143, filed Jan. 5, 2011, titled "Methods and Apparatus for Taking an Advertising Action Using a Bot," all of which are hereby incorporated by reference in their entireties. The present application claims the benefit under 35 U.S.C. §120 and is also a continuation-in-part of U.S. patent application Ser. No. 12/671,846 filed on Feb. 2, 2010, titled "Method System, and Computer Program for User-Driven Dynamic Generation of Semantic Networks and Media Synthesis."

BACKGROUND

1. Field of Invention

The techniques described herein are directed generally to the field of performing semantic search of content.

2. Description of the Related Art

The Internet is a global system of interconnected computer networks that store a vast array of information. The World Wide Web ("WWW") is an information sharing model built on top of the Internet, in which a system of interlinked hypertext documents are accessed using particular protocols (i.e., the Hypertext Transfer Protocol and its variants).

Because of the enormous volume of information available via the WWW and the Internet, and because the available information is distributed across an enormous number of independently owned and operated networks and servers, locating desired content on the WWW and the Internet presents challenges.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a WebCrawler that browses the WWW in an automated fashion (e.g., following every hyperlink that it comes across in each web page that it browses). The retrieved web pages and/or content are analyzed and information about the web pages or content is stored in an index. When a user issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's query.

SUMMARY

In some embodiments, a method for semantic searching is disclosed. The method comprises receiving a first search query, obtaining a disambiguation term for semantically disambiguating the first search query, and creating a second search query based at least in part on the first search query and the disambiguation term. The method may also include at least one of outputting search results obtained from a search conducted based at least in part on the second search query and sending the second search query to a search service for outputting search results.

In some embodiments, a system for semantic searching is disclosed. The system includes a processor configured to execute a method comprising receiving a first search query, obtaining a disambiguation term for semantically disambiguating the first search query, and creating a second search query based at least in part on the first search query and the disambiguation term. The method may also include at least one of outputting search results obtained from a search conducted based at least in part on the second search query and sending the second search query to a search service for outputting search results.

In some embodiments, a computer readable storage medium is disclosed. The computer-readable storage medium stores processor-executable instructions that when executed by a processor, cause the processor to perform a method of semantic searching. The method comprises receiving a first search query, obtaining a disambiguation term for semantically disambiguating the first search query, and creating a second search query based at least in part on the first search query and the disambiguation term. The method also comprises at least one of outputting search results obtained from a search conducted based at least in part on the second search query and sending the second search query to a search service for outputting search results.

In some embodiments, a method of identifying trendy terms is disclosed. The method comprises receiving time-stamped content comprising a plurality of terms, calculating, with a processor, a trend score for each term in the plurality of terms based at least in part on a decay function, and outputting a result based on one or more terms, called trendy terms, that are identified based on the calculated trend scores.

In some embodiments, a method of taking an advertising action is disclosed. The method comprises categorizing, with a processor, a term appearing within a body of information content into one or more of a plurality of categories based at least in part on one or more trend scores calculated for the term, and taking the advertising action with respect to the term based on the one or more categories in the plurality of categories into which the term is categorized.

In some embodiments, a method is disclosed. The method comprises receiving a first search query, synthesizing, with a processor, a semantic representation of the first search query, obtaining search results based on a search conducted based at least in part on the first search query, and ranking or annotating the search results based at least in part on terms contained both in the search results and the semantic representation.

In some embodiments, a system is disclosed. The system comprises a processor configured to execute a method comprising receiving a first search query, synthesizing a semantic representation of the first search query, obtaining search results based on a search conducted based at least in part on the first search query, and ranking or annotating the search results based at least in part on terms contained both in the search results and the semantic representation.

In some embodiments, a computer-readable storage medium is disclosed. The computer-readable storage medium stores processor-executable instructions that when executed by a processor, cause the processor to perform a method. The method comprises receiving a first search query, synthesizing a semantic representation of the first search query, obtaining search results based on a search conducted based at least in part on the first search query, and ranking or annotating the search results based at least in part on terms contained both in the search results and the semantic representation.

DETAILED DESCRIPTION

Figure 1:
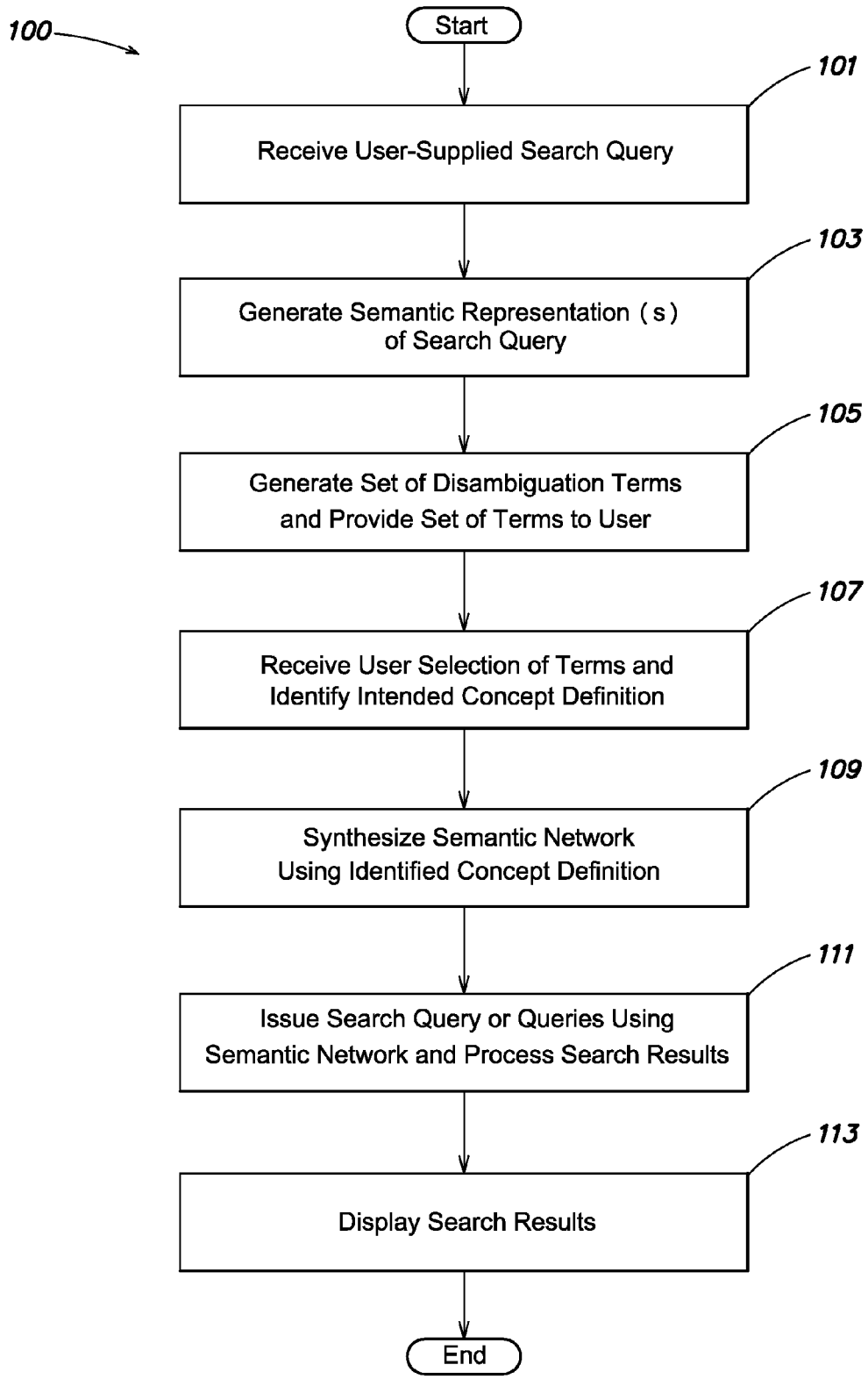
FIG. 1 is a flowchart of an illustrative process for performing semantic search, in accordance with some embodiments of the present disclosure.

The inventors have recognized that most conventional Internet search engines simply perform pattern matching between the literal terms in the user's search query and literal terms in the indexed content to determine what pieces of content are relevant to the user's query. The inventors have recognized that such search engines generally do not attempt to represent the semantic meaning of the user's search query, instead focusing on the semantic meaning of words and phrases in the indexed content. Thus, when a user enters a search query with a term whose meaning is ambiguous, the search engine is likely to return results that are entirely unrelated to the meaning of the term that the user intended.

For example, if a user provides the search query "bark," it is unclear whether the user is searching for information related to the sound a dog makes, information about the outer skin of a tree, information about three-masted sailing ships, or information about some other meaning of the word "bark." Most search engines attempt to identify several possible meanings of the term bark and return results that include a mix of these possible meanings.

The inventors have recognized that by determining the semantic meaning of the user's search query, search results that are more likely to include information in which the user is interested may be identified and returned. For example, if the user provides the search query "bark," and it is known that the user's intent in that search query is to uncover information about tree bark, it may be desirable to return those pieces of content relating to tree bark, and to not return other pieces of content that include the word bark, but are related to other meanings of that term (e.g., pieces of content about barking dogs or three-masted sailing ships).

A number of "semantic search" techniques have been developed that attempt to identify content that matches a search query based on the meaning of words in the content, and not just the appearance of certain words. However, these techniques generally rely on creating a semantic representation of each document or piece of content in the universe of information to be searched.

The inventors have recognized that semantic search techniques that rely on generating a semantic representation of each document or piece of content in the universe of content to be searched have some disadvantages. Specifically, because of the enormously large volume of content on the WWW, generating a semantic representation of each individual document or piece of content may not be practical. This problem is compounded by the fact that much of the content that is published on the WWW is intended for immediate consumption, known as the real-time Web. Thus, such content may be stale by the time a semantic representation of it can be generated.

This problem of semantic annotation of content is one of the most significant and costly barriers to Web-scale and real-time semantic search. The inventors have recognized that by providing a semantic representation of the user's input query and intentions for the content, the content that is being searched does not need to be semantically annotated in advance; the approach works effectively with unstructured content sources.

Some embodiments are directed to techniques for performing a semantic search. Some of these embodiments address the above-described disadvantages of prior art search techniques, but not every embodiment addresses all of these disadvantages and some embodiments may not address any of these disadvantages. In this respect, it should be understood that the invention is not limited to addressing all or any of the above-discussed disadvantages of prior art search techniques.

FIG. 1 is a flow chart of an illustrative process 100 for performing semantic search that may be used in some embodiments. The process of FIG. 1 begins at act 101, where a user-generated search query is received. The process then continues to act 103, where one or more semantic representations of the user's search query are generated. For example, as discussed in greater detail below, in act 103 one or more concept definitions may be generated, each of which is a semantic representation of one possible semantic meaning of the user's search query.

The process then continues to act 105, where a set of disambiguation terms that are potentially related to the intended meaning of the user's search query are generated from the semantic representation(s) generated in act 103. This set of terms may be provided to the user so that the user may select those terms and phrases that are related to the intended meaning of his or her search query. It should be appreciated that a term may comprise one or more words or one or more phrases. The process then proceeds to act 107, where the disambiguation terms that the user has indicated as being related to his or her search query are received, and, based on the disambiguation terms selected by the user, a semantic representation of the user's search query that is believed to capture the user's intended meaning of the search query is selected. The process then continues to act 109 where a synthesis operation on the selected semantic representation is performed. As a result of this synthesis operation, an expanded semantic network may be generated. The process then proceeds to act 111, where one or more search queries are issued based on the concepts in the expanded semantic network and the results of the one or more search queries are received and ranked and/or filtered to generate a set of search results to be presented to the user. The process next continues to act 113, where these search results are displayed to the user. Each of the acts of the process of FIG. 1 may be performed in any of a variety of ways, and some examples of the ways in which these acts may be performed in various embodiments are described in greater detail below.

Process 100 illustrated in FIG. 1 and any of its variants may be implemented in any of numerous ways. For instance, process 100 may be implemented using hardware, software or a combination thereof. When implemented in software, the software may execute on any suitable processor or collection of processors. The software may be stored as processor-executable instructions and configuration parameters; such software may be stored on a computer-readable storage medium.

Figure 7:
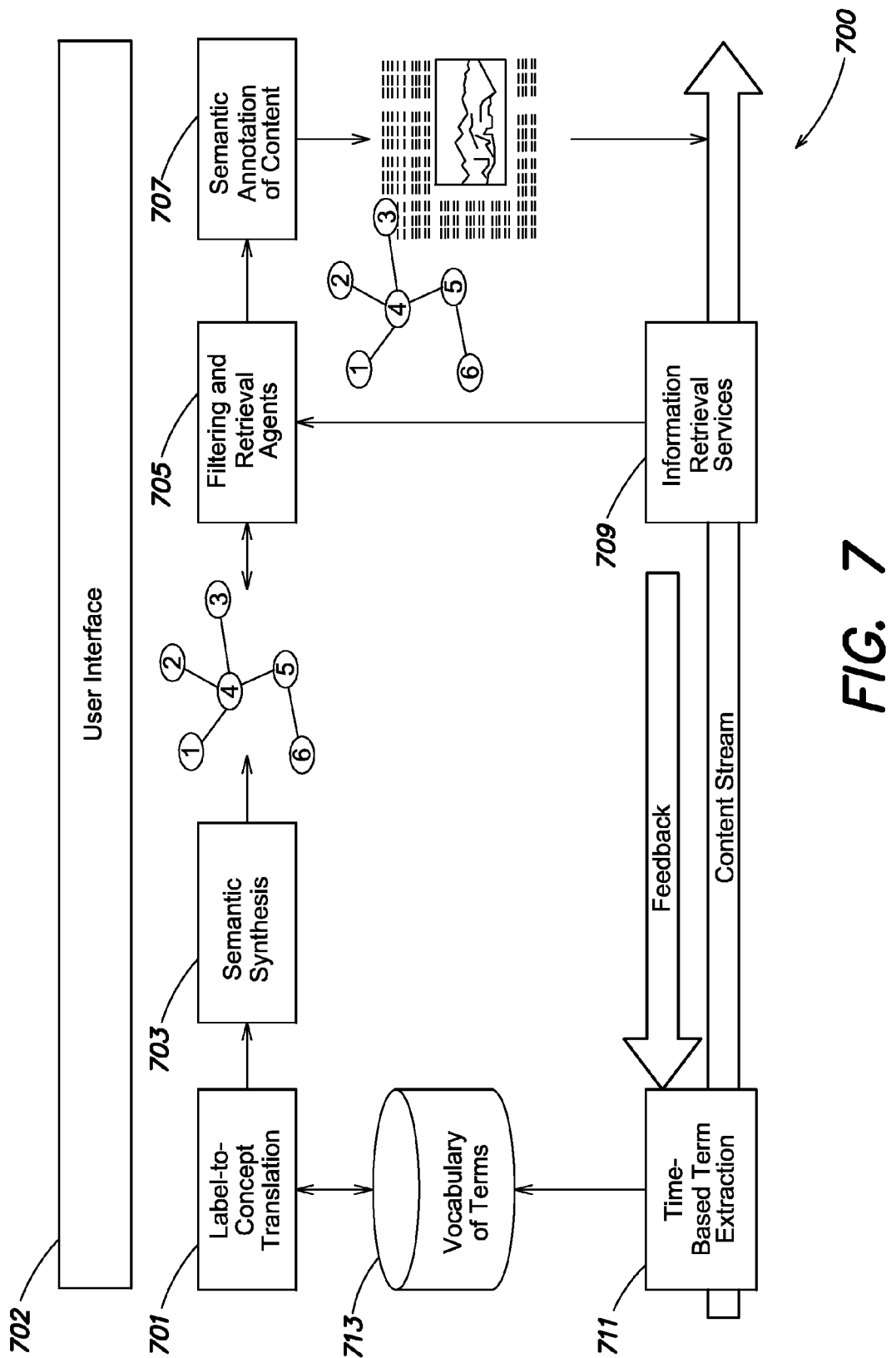
FIG. 7 is a diagram of an illustrative system for performing a semantic search, in accordance with some embodiments of the present disclosure.

Software implementing process 100 may be organized in any suitable manner. For example, it may be organized as software system 700 comprising a plurality of software modules as shown in FIG. 7. In the illustrated example, each software module may perform at least a part of one or more acts of process 100. Though, in some embodiments, one or more software modules of software system 700 may perform functions not related to acts of process 100 as the invention is not limited in this respect. Illustrated software system 700 comprises a number of software modules including label-to-concept translation module 701, user interface module 702, semantic synthesis module 703, filtering and retrieval agents module 705, semantic annotation module 707, information retrieval services module 709, time-based term extraction module 711, and vocabulary of terms module 713. In some embodiments, acts 101, 107, and 113 of process 100 may be performed by user interface module 702, acts 103 and 105 of process 100 may be performed by label-to-concept translation module 701, act 109 of process 100 may be performed by semantic synthesis module 703, and act 111 of process 100 may be performed by filtering and retrieval agents module 705 and information retrieval services module 709.

I. Receiving a User-Generated Search Query

Figure 2:
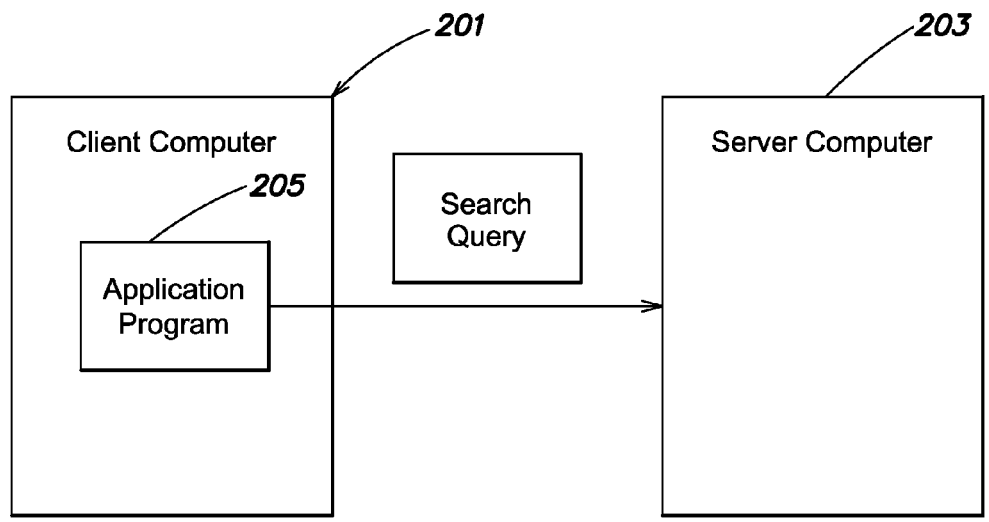
FIG. 2 is a block diagram of an illustrative client/server architecture for providing a user search query to a server, in accordance with some embodiments of the present disclosure.

As discussed above, at act 101 of process 100, a search query supplied from a human user may be received. In the illustrative software system 700, act 101 may be performed by user interface 702. The search query may be received in any of a variety of possible ways. For example, in some embodiments, the search query may be provided from a user's client computer to a server computer that executes software code that performs process 100. That is, for example, as shown in FIG. 2, a user may operate a client computer 201 that executes an application program 205. Server 203 may be a computer that performs process 100. The user may enter a search query into application program 205 and the application program may send this search query to server 203. Thus, server 203 may receive the search query from application program 205 executing on client 201.

Application program 205 may be any of a variety of types of application programs that are capable of sending information to and receiving information from server 203. For example, in some embodiments, application program 205 may be an Internet or WWW browser.

In the example of FIG. 2, application program 205 is shown as sending the user-supplied search query directly to server 203. It should be recognized that this is a simplified representation of how the user's search query may be sent from client 201 to server 203, and that the user's search query need not be sent directly from client 201 to server 203. For example, in some embodiments, the user's search query may be sent to server 203 via a network. The network may be any suitable network such as a LAN, WAN, or the Internet.

II. Generating One or More Semantic Representations of a Search Query

As discussed above, at act 103 of process 100, one or more semantic representations of the user's search query may be generated. In the illustrative software system of FIG. 7, this act may be performed by label-to-concept translation module 701. Each semantic representation may correspond to one possible semantic meaning of the user's search query. Any of a variety of possible techniques may be used to generate a semantic representation of the user's search query. An example of one such technique that may be used in some embodiments is illustrated in process 300 of FIG. 3. In the example technique described below in connection with FIG. 3, a plurality of semantic representations, referred to as "concept definitions," of a user's search query are generated using a semantic lexicon.

As explained in U.S. patent application Ser. No. 12/671, 846, concepts may be defined in terms of compound levels of abstraction through their relationship to other entities and structurally in terms of other, more fundamental knowledge representation entities such as keywords and morphemes. Such a structure may be referred to as a concept definition. Collectively, the more fundamental knowledge representation entities such as keywords and morphemes that comprise concepts are referred to as attributes of the concept.

A semantic lexicon is a collection of words that includes semantic relationships between words. One example of a semantic lexicon that may be used in some embodiments is the WordNet semantic lexicon maintained by Princeton University. In the illustrative software system of FIG. 7, the semantic lexicon is illustrated by the vocabulary of terms module 713.

In some embodiments, the contents of a semantic lexicon may remain the same over time. Though, in other embodiments, such as those described in Sections VIII, IX and X, contents of a semantic lexicon change over time. For instance, words may be added to or removed from a semantic lexicon.

In some embodiments, a semantic lexicon may be represented by a graph comprising nodes and edges between nodes. The graph may represent the lexicon by associating nodes with one or more terms. Edges between two nodes may indicate a relationship between terms associated with these nodes. For instance, the relationship may be a "defined-by" relationship or a "is-a" relationship. Concept definitions may be based on term(s) associated with nodes that are adjacent to node(s) that contain one or more tokenized terms. For example, such adjacent nodes may include terms that possess "defined-by" or "is-a" relationships to the node that contains the one or more tokenized terms.

Figure 3:
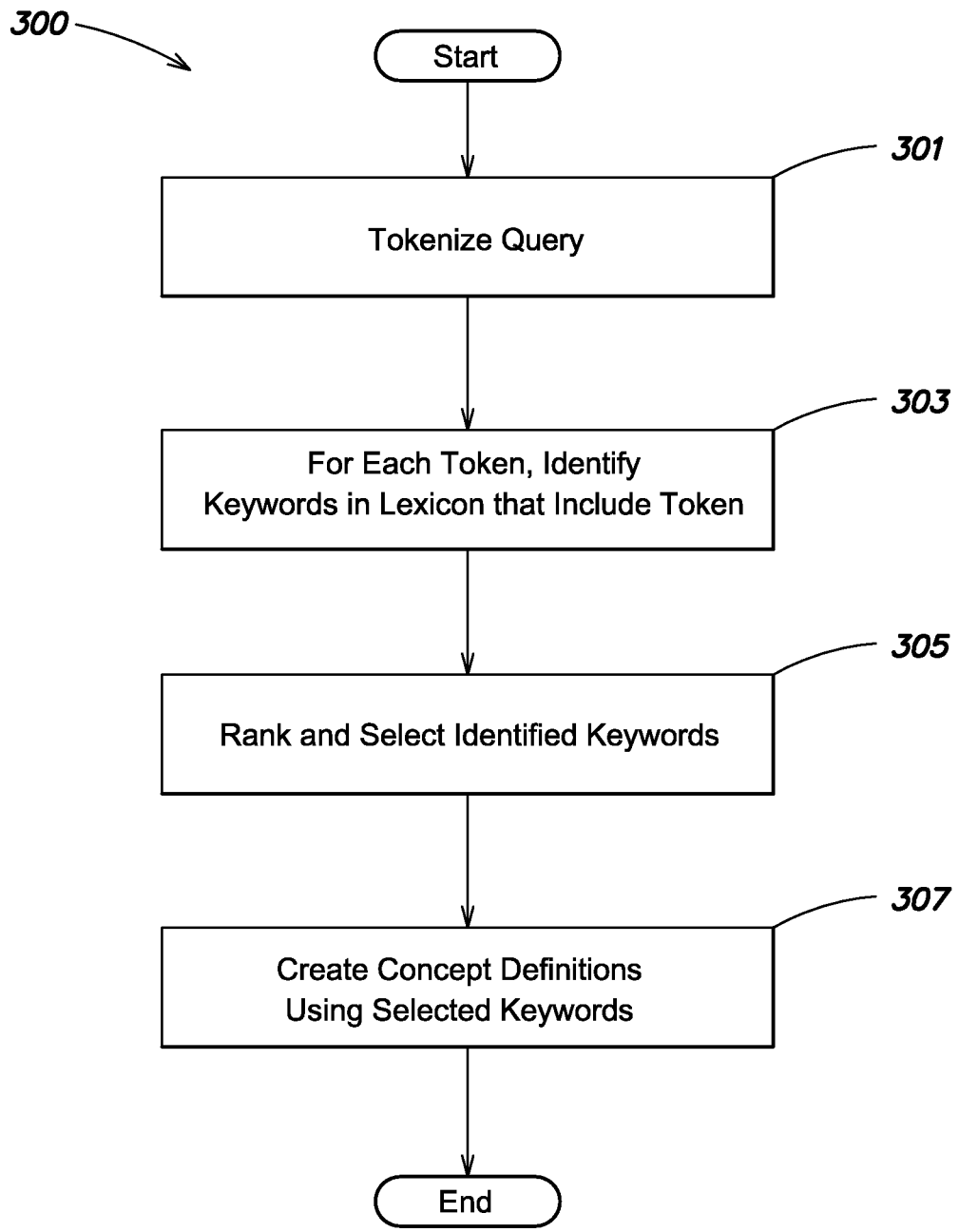
FIG. 3 is a flowchart of an illustrative process for generating one or more semantic representations of a search query, in accordance with some embodiments of the present disclosure.

Process 300 in FIG. 3 generates one or more concept definitions (i.e., semantic representations) for a search query (e.g., a free-text search query input by a user). The process begins at act 301, where the user's query may be tokenized, or separated into individual words, where each individual word is a token. For example, the user's query "Love and war" may be tokenized into three tokens: (1) "Love"; (2) "and"; and (3) "war".

The process next continues to act 303, where for each token that is not a stop word, keywords in the semantic lexicon that include the token may be identified. Stop words are words such as "and" and "the" that are filtered out or ignored in process 300.

The process next proceeds to act 305, where the keywords identified in act 303 are ranked and a subset of the identified keywords are selected for use in generating concept definitions. For example, a lexicon may have 9,000 keywords that use the word, "Love." At act 305, all or a portion of these (e.g., the top ten percent, the top five percent, or any other suitable portion) may be selected to use in creating concept definitions.

Any of a variety of possible techniques or criteria may be used to rank the identified keywords. Examples of criteria that may be used in some embodiments include: (a) keywords that exactly match multiple tokenized words may be ranked higher than keywords that do not. For example, if the tokenized words are "American" and "Albums", then the keyword "American Albums" may rank higher than the keyword "American" or the keyword "Albums"; (b) keywords that exactly match the tokenized word may be ranked higher than keywords that do not. For example, the word "Love" may be better-matched by the keyword "Love" than by the keyword "Love in politics." and/or (c) Keywords that use more than one tokenized word may be ranked higher than keywords that do not. For example, if the tokenized words are "American," "Pop" and "Albums," the keywords "Pop Albums" may be ranked higher than the keywords that only include "Pop" or only include "Albums." Each of these criteria could be used alone or could be used in any of a variety of combinations with any of the other criteria.

After act 305, the process continues to act 307, where concept definitions may be created based on the keywords selected in act 305. For example, keywords generated in act 103 may include: love, war, love songs, war and peace, war politics, love and satire, love story, romance and love, war machines, ships of war, war council, war minister, love ballad, war literature, love triangle.

Concept definitions may be produced as replications of the keyword representations. Alternatively they may be created by parsing the set of keywords that emerged from step 305 and rejoining related components of the parsed keywords. Components may be deemed related if the key words from which they were parsed originated from the same token. Concept definitions generated from keywords in the instant example may include, (war, peace, politics), (love, songs), (love, romance, ballad, story, triangle), (war, machines, ships), (war, politics, council, minister), etc. As stated above, each concept definition may correspond to one possible semantic meaning of the user's search query.

In some embodiments, each concept definition may have one and only one keyword from each token (except stop words and words for which there are no keywords), and each concept definition, may use each keyword no more than once (even if it maps to more than one token).

In some embodiments, if the user's text query includes one or more unknown words (that is, any words for which there exist no keywords in the lexicon), then a new keyword with the user's full text query as its label may be created. The new keyword may have no ancestors or descendants. This new keyword may be discarded at the end of the translation process or added to the semantic lexicon for future consideration.

For example, if the user's query is "German blitzkrieg", and the word "blitzkrieg" is not used by any of the domain's keywords, the system may create a new keyword with the label "German blitzkrieg", to represent this unit of unknown meaning. The concept definition for the query may then be composed of the known keywords from the lexicon, along with the new keyword labeled "German blitzkrieg." Alternatively, instead of creating new keywords for unknown words, process 300 may ignore unknown words.

Each of the concept definitions generated at act 307 may be the basis of a semantic network. A semantic network is a type of knowledge representation that takes the form of a directed graph comprising vertices, which represent concepts, and edges between the vertices, which represent semantic relationships between the concepts.

For example, a concept definition [love, war, novel] obtained from query "love and war" may be considered a semantic network with "love," "war," "love and war," and "novel" each represented by a vertex, and directed edges joining one or more vertices. The concept definition may be created utilizing a semantic lexicon that is a graphical lexicon. The graphical lexicon may comprise a node associated with the keywords "love and war" (incidentally, these keywords are likely to be highly ranked because of the exact match with the two tokens of interest). An adjacent node may include the term "novel."

Accordingly, the concept definition [love, war, novel] may be considered a semantic network that includes one vertex for the node with "love and war" and another vertex for "novel." The individual tokenized terms and constituent terms of any given node may be the basis for establishing additional vertices, such as a vertex for "love" and a vertex for "war."

A vertex in the semantic network may be designated as a root vertex. In the instant example, the vertex "love and war" may be designated a root vertex. "Love and war" may be designated as the root vertex because it is the initial node identified in the semantic lexicon that is the basis for including "novel" from an adjacent node, as well as the basis for including "love" and "war" as constituents of the initial node and tokenized terms of interest. In the semantic network of the concept definition, every other vertex may emanate from and be directly adjacent to the root vertex.

III. Generating a List of Disambiguation Terms

As discussed above, at act 105 of process 100, the semantic representations or concept definitions generated in act 103 may be used to generate a set of disambiguation terms that may be provided to the user, such that the user may select those terms that are related to his or her intended meaning of the search query. As such, the disambiguation terms may be used for semantically disambiguating the meaning of the search query. In the illustrative software system 700, act 105 may be performed by label-to-concept translation module 701, though it may be performed by any other suitable module. That is, for example, if the user's query is "bark" the concept definitions may be used to provide a set of disambiguation terms from which the user may select to disambiguate his or her intended meaning of the word "bark."

The terms may be generated in any suitable way. For example, one or more keywords from the concept definitions generated in act 103 may be provided to the user as one of the disambiguation terms. In some embodiments, the provided keywords may not match any of the tokens in the user's search query, though in other embodiments one of the provided keywords may match a token in the search query.

Figure 4:
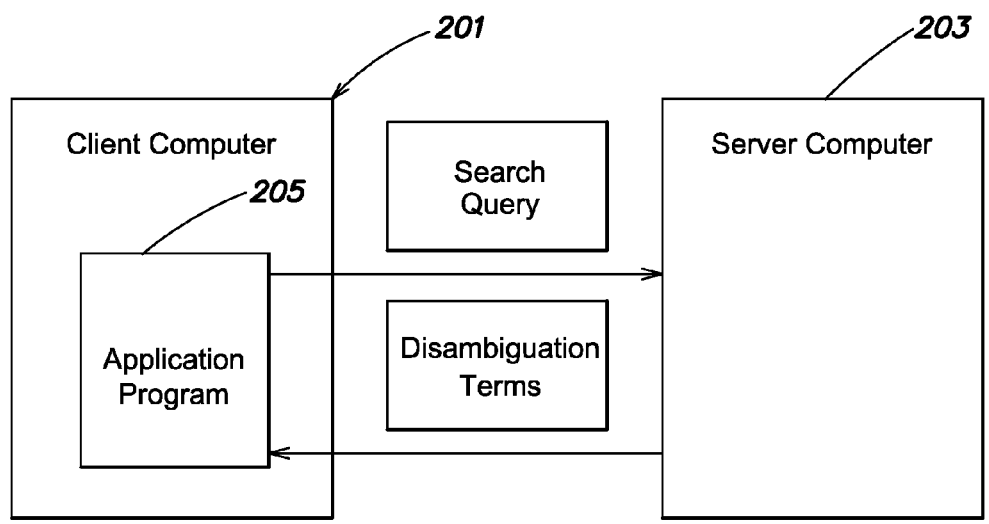
FIG. 4 is a block diagram of an illustrative client/server architecture that may be used to implement some embodiments of the present disclosure.

The terms may be provided to the user in any of a variety of possible ways. For example, as shown in FIG. 4, the terms may be provided from server 203 (i.e., the computer that performs process 100) to the application program 205 on client 201 from which the user issued the search query.

Figure 5:
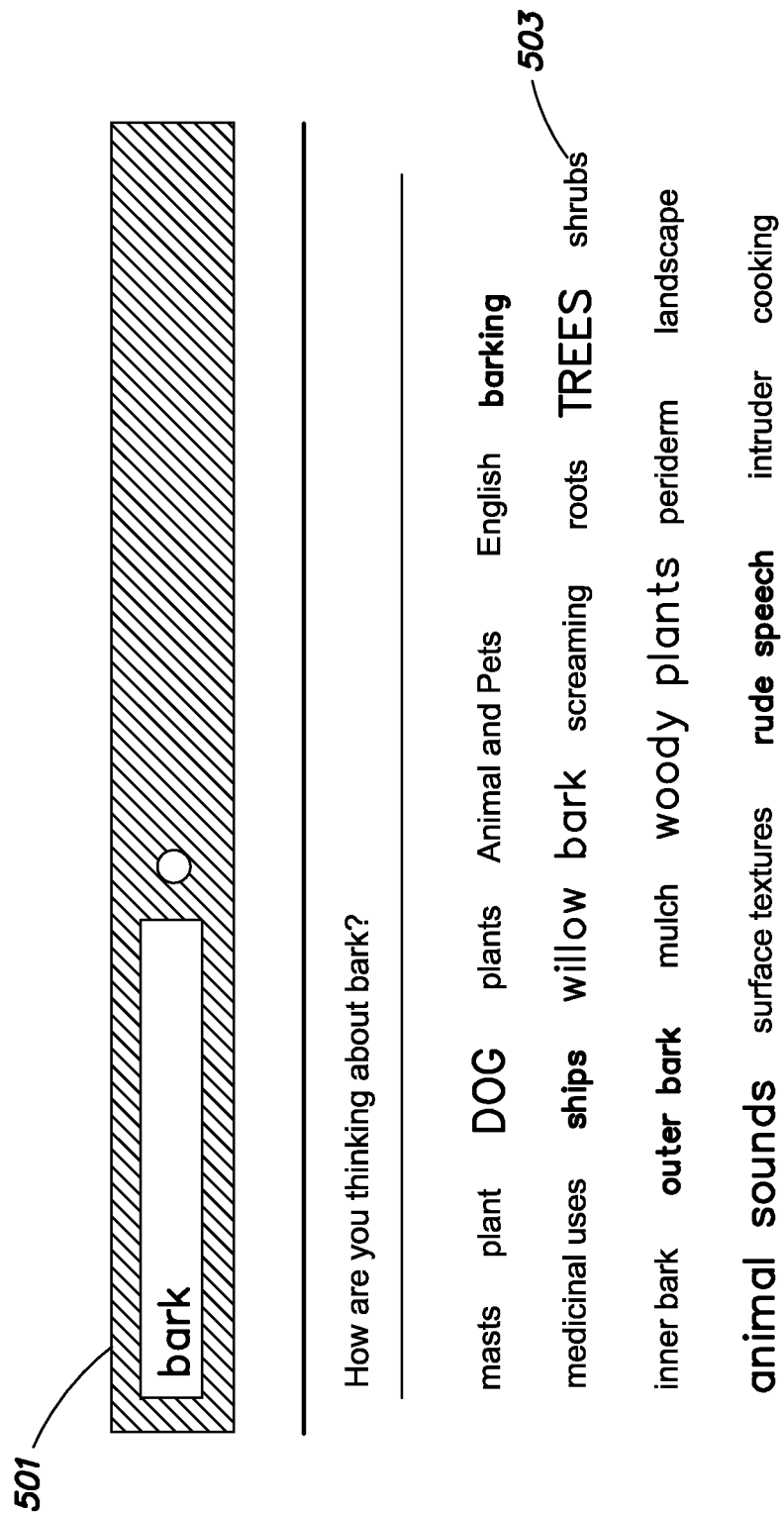
FIG. 5 is a diagram illustrating a display which may be used to present to a user a set of disambiguation terms, in accordance with some embodiments of the present disclosure.

In embodiments in which application program 205 is an Internet or WWW browser, the terms may be provided in the form of a web page. FIG. 5 shows an example of web page that may include the terms generated from the concept definitions for the user query "bark" 501. As can be seen in item 503 of FIG. 5, the user may select one or more terms to disambiguate his or her intended meaning of the term bark.

IV. Identifying Intended Concept Definition based on Selected Disambiguation Terms As discussed above, at act 107 of process 100, a user may select one or more terms from the set of disambiguation terms and an indication of the terms that the user has selected may be received. For example, the application program that received the list of terms generated in act 105 may accept input from the user selecting one or more of the terms, and may send an indication of the user-selected term(s) to the server executing process 100. In the illustrative software system 700, portions of act 107, such as accepting input from the user, may be performed by user interface module 702.

Based on the term(s) that the user has selected, a concept definition generated in act 103 may be selected as the concept definition that captures the user's intended meaning of the search query. This may be done in any of a variety of ways. For example, in some embodiments, each concept definition that includes one of the terms selected by the user may be identified and the semantic networks representing the identified concept definitions may be merged to form a single semantic network that serves as the concept definition that best captures the user's intended meaning of the search query.

Semantic networks of the concept definitions may be merged in any of numerous ways. When utilizing a non-graphical semantic lexicon, multiple concept definitions that are selected and that share a unique term in common may be used to construct a single semantic network. The single semantic network may be formed based on the multiple concept definitions by merging the individual semantic networks that represent each concept definition at the vertex depicting the common term.

When utilizing a graphical semantic lexicon, two different concept definitions may be derived from distinct nodes in the semantic lexicon and merged into a single semantic network. Thus, one concept definition of "love, war, novel" may be derived from the node "love and war" and its adjacent node "novel." A second concept definition of "love, war, movie" may be derived from a distinct node "love and war" and its adjacent node "movie." These concept definitions that may initially be represented by distinct semantic networks may be merged around a vertex "love and war" with two adjacent vertices of "novel" and "movie." Thus, a novel semantic network, customized to the user, may be created.

V. Synthesizing an Expanded Semantic Network

As discussed above, at act 109 of process 100, a semantic network may be synthesized using the concept definition identified in act 107 as the concept definition that captures the user's intended meaning of the search query. In the illustrative software system of FIG. 7, this act may be performed by semantic synthesis module 703. In this respect, the concept definition identified in act 107 (e.g., based at least in part on user input) may be considered the active concept definition for the synthesis process.

The synthesis process at act 109 identifies concepts related to the concept defined by the active concept definition and generates an expanded semantic network of the concept defined by the active concept definition. That is, for example, the synthesis process may identify terms that are related to the terms in the active concept definition and generate an expanded semantic network that includes both the terms from the active concept definition and the related terms.

The concepts in the synthesized expanded semantic network may serve as the basis for one or more search queries derived from the user-supplied search query received in act 101. The expanded semantic network may provide a large set of related terms that are consistent with the user's query or intentions, to facilitate downstream search operations across both structured and unstructured content sources.

The semantic network may be synthesized in any of a variety of ways. One possible technique for synthesizing a semantic network that may be used in some embodiments is described below. In this technique, a candidate set of concepts that are related to the concept defined by the active concept definition may be generated. The candidate set of concepts may be generated using the keywords in the active concept definition and the keywords in a semantic lexicon. As discussed above, the semantic lexicon may include a set of keywords along with relationships (e.g., parent and child relationships) among those keywords. In this sense, the semantic lexicon may be thought of as a keyword hierarchy. In the illustrative software system of FIG. 7, the semantic lexicon is illustrated by vocabulary of terms module 713.

In some embodiments, the semantic lexicon that is used may be the same semantic lexicon used in act 103 to create concept definitions, while in other embodiments a different semantic lexicon may be used. As previously described the semantic lexicon may be augmented. In some embodiments, the semantic lexicon may be augmented with so-called "trendy" terms (e.g., terms with a trend score in predetermined range, such as higher than a predetermined threshold). As such, a semantic network may be generated based at least in part on terms in the semantic lexicon and one or more "trendy" terms, which were selected based on their trend score. Methods for identifying trendy terms and computing the associated trend scores are discussed in greater detail below in Section VIII.

The set of keywords of the active concept definition may be compared with the keyword hierarchy in the semantic lexicon to find explicitly-related ancestor and descendant keyword sets. A keyword set from the semantic lexicon that is a subset of elements in the keyword set making up the active concept definition and/or is an explicit ancestor of the keyword set making up the active concept definition may be considered as a possible ancestor keyword set of the keyword set for the active concept definition. Within each ancestor keyword set, each keyword may have its own set of semantically related concepts. Combinations of these semantically-related concepts obtained from different keywords within a given keyword set may be used to generate concepts of interest that match the keyword set and may be used to generate concepts for the candidate concept set. For example, "orange tree" as an active concept may have "citrus orchard" as one ancestor keyword set. "Citrus orchard" in turn may have a keyword set "lime bush" as a related concept, where "lime" may be derived from "citrus" and "bush" may be derived from "orchard." Accordingly, "lime bush" may be a concept of interest and match the keyword set "orange tree" of the active concept definition.

A similar process may be used to identify descendant keyword sets of the keyword set for the active concept definition. For example, keyword sets from the semantic lexicon which are supersets and/or which have elements that are explicit descendants of those in the keyword set for the active concept definition, may represent possible descendant concepts. Here again, the candidate set of concepts may comprise combinations of keyword sets related to the active concept. For example, "orange tree" as an active concept may have "orange tree crop yield" as one descendant keyword set and may have "Florida orange tree" as another descendant keyword set. The combination of "crop yield" and "Florida," such as "Florida crop yield," may represent concepts that are of interest and match the keyword set "orange tree" of the active concept definition. Further, a term that may be found in more than one descendant keyword set (e.g., in an intersection of multiple keyword sets) may be of interest. Aggregating, or taking the union of all such terms that occur in more than one descendant keyword set may represent a keyword set for a candidate set of concepts.

A set of derivation rules may be applied to the keyword sets of each of the concepts in the candidate set to generate the semantic network in the form of a hierarchy of concepts. The keyword set for the active concept definition may be paired with each of the keyword sets for the concepts in the candidate set. For each pair, a sequence of set operations may be derived which transforms the keyword set for the active concept definition into its paired set. These operations, referred to as derivations, may define how the candidate concept is related to the concept defined by the active concept definition.

Any of a variety of possible derivation operations may be performed. Examples of four types of derivation operations that may be used in some embodiments are illustrated in Table 1 and described below.

TABLE 1

Derivation operation types

|  | To make implicit relationships | To make explicit relationships |
|---|---|---|
| with ancestors | d: delete a keyword | p: replace a keyword with a parent keyword |
| with descendants | a: add a keyword | c: replace a keyword with a child keyword |

Note that the directionality of all the keyword relationships may need to be consistent within pairs of potential concept relationships. Pairs of keyword sets may have ancestor relationships or descendant relationships between their keywords but may not have both. The semantic network synthesis operation may preserve this directionality by only applying either ancestor operations (p, d) or descendant operations (c, a), not both, to establish a relationship between concepts. This may prevent a concept from having all its keywords replaced with those corresponding to an unrelated concept.

For example, given an active concept definition with keywords {A, B, C} and a candidate concept in the set of candidate concepts with keywords {D, B, G, F}, there may be three axes running through the active concept definition corresponding to its three keywords. To determine whether a relationship exists between the concepts, one could first use explicit relationships, for example an explicit relationship from A to its explicit child D, and another from C to its explicit child G. (These are both c operations: replacing a keyword with a child keyword.) Finally, using the implicit a operation of adding a descendant keyword (namely F) may result in the active concept definition's keyword set matching that of the candidate descendant. Therefore one may refer to the candidate as a descendant of the active concept definition.

To illustrate, when pairing the active and candidate keyword sets, there may be three possible groups of keywords:
those associated with the candidate set only ("candidate-only" keywords)
those associated with both the candidate set and the active set ("both" keywords)
those associated with the active set only ("active-only" keywords)

If transforming the active set to the candidate set requires deleting "active-only" keywords, then the candidate set may be an ancestor of the active set. If the active set has the same number of keywords as the candidate set and no active keyword possesses a child or parent relationship with any candidate keyword, then the candidate set may be a sibling of the active set. If transforming the active set to the candidate set requires adding "candidate-only" keywords, then the candidate set may be a descendant of the active set.

It may not be valid to transform an active set to a candidate set by both deleting "active-only" keywords and adding "candidate-only" keywords, regardless of whether the two original sets already have keywords in common. Such a pair may be deemed to be unrelated. An exception to this may be when keywords in the "only" sets are related in the keyword hierarchy of the lexicon. In such a case, one of two operations may be performed:
replace an active set keyword with its parent keyword (with candidate sets that are ancestors of the active set); or
replace an active set keyword with its child keyword (with candidate sets that are descendants of the active set)

Thus, each concept in the set of candidate concepts may have a unique derivation series connecting it to the active concept definition. The order in which derivations are sorted and dealt with by the synthesis operations may affect the ordering of concepts in the resulting hierarchy. The priority of a candidate concept in the hierarchy may be determined according to Table 2.

TABLE 2

Priority of derivations in determining result hierarchy

|  | Prevalence in candidate set | Prevalence in lexicon |
|---|---|---|
| Explicit operations (p, c) | 1 | 2 |
| Implicit operations (a, d) | 3 | 4 |

The output of applying the derivation rules and priorities is an expanded semantic network in the form of a hierarchy of concepts.

VI. Issuing Search Queries and Filtering Results

As discussed above, at act 111 of process 100, the semantic network generated in act 109 may be used to generate one or more search queries to be provided to one or more search services. For example, one or more of the concepts in the semantic network may each be issued as a search query to the search service. In the illustrative software system of FIG. 7, queries may be issued by the retrieval agents in filtering and retrieval agents module 705, and the search services may be performed by information retrieval services module 709.

The search service may be any general purpose search engine. For instance, the search service may be any search engine that may be publicly accessible via the Internet. Examples of such search engines include Google™, Bing™, and Yahoo! Search™. As another example, the search service may be a search engine accessible via any computer network other than the Internet. Examples of such search engines include search engines used for searching a corporate intranet or any other private network.

The search query or queries that are issued to the search service may be generated from the semantic network in any of a variety of possible ways. For example, in some embodiments, the root node of the concept hierarchy in the semantic network may be issued as a search query to the search service. The remaining concepts in the concept hierarchy may be used to filter and/or rank search results, as discussed below. As another example, a search string may be formed by joining each concept in the concept hierarchy together with a Boolean "AND" and issuing this search string as the search query.

Another example of a technique that may be used in some embodiments to generate a search query is to join each term in the concept hierarchy that was explicitly provided by the user (i.e., the tokens from the search query received in act 101 and the disambiguation terms received in act 107) by a Boolean "AND," and to join terms related to those terms by a Boolean "OR." Thus, for example, if the user originally provided the query "Love and War" and then selected the term "novel" from the set of disambiguation terms, the terms "love," "war," and "novel" may be joined together in the search query by a Boolean "AND." In addition, each of these terms may be joined to related terms by a Boolean "OR." For example, if the concept hierarchy indicates that the terms related to the term "love" are "affection" and "marriage," the terms related to the term "war" are "battle" and "fight," and the terms related to the term "novel" are "book" and "literature," the resulting search query may be: "(love OR affection OR marriage) AND (war OR battle OR fight) AND (novel OR book OR literature)." This type of complex query would rarely be composed by an end-user. It has the effect of creating a detailed representation of the meaning of the query. Since the complex query generated with the expanded semantic network will match literal terms in the content indexed by the search service that are not necessarily literal terms in the original query, it creates an effective semantic search, even if the content has not been semantically analyzed in advance (that is, unstructured content).

In response to issuing the one or more search queries to the search service, a set of search results may be received from the search service. The text (or fragments of the text) of the documents or pieces of content in the search results may be compared to the concept definitions in the semantic network generated in act 109 and the returned search results may be ranked and/or filtered out based on how closely they match these concept definitions. In the illustrative software system of FIG. 7, the filtering and ranking of results may be performed by the filtering agents of filtering and retrieval agents module 705.

Any of a variety of possible ranking or filtering techniques may be used, as the invention is not limited in this respect. Search services may provide a number of textual features in their search results: titles, abstracts, descriptions, tags, hyperlinks, etc. These textual features may provide for text analysis as a means to filter the search engine results against the terms provided through the expanded semantic network, for example, by comparing the terms against words in the textual features of the search engine results. Whole or partial matches of terms may be used to weigh the relevance of the individual results.

In addition, in some embodiments, each of the documents or pieces of content may be semantically annotated or tagged using the semantic network, such that semantic metadata describing the semantic meaning of these pieces of content may be embedded as metadata therein. As shown in FIG. 7, module 707 illustrates the semantic annotation of content 707 in software system 700. Any of a variety of techniques for semantically annotating the content may be used. For example, in some embodiments, one or more content nodes may be identified in each piece of content and the content node may be tagged with the best matching concept definition in the semantic network.

Figure 11:
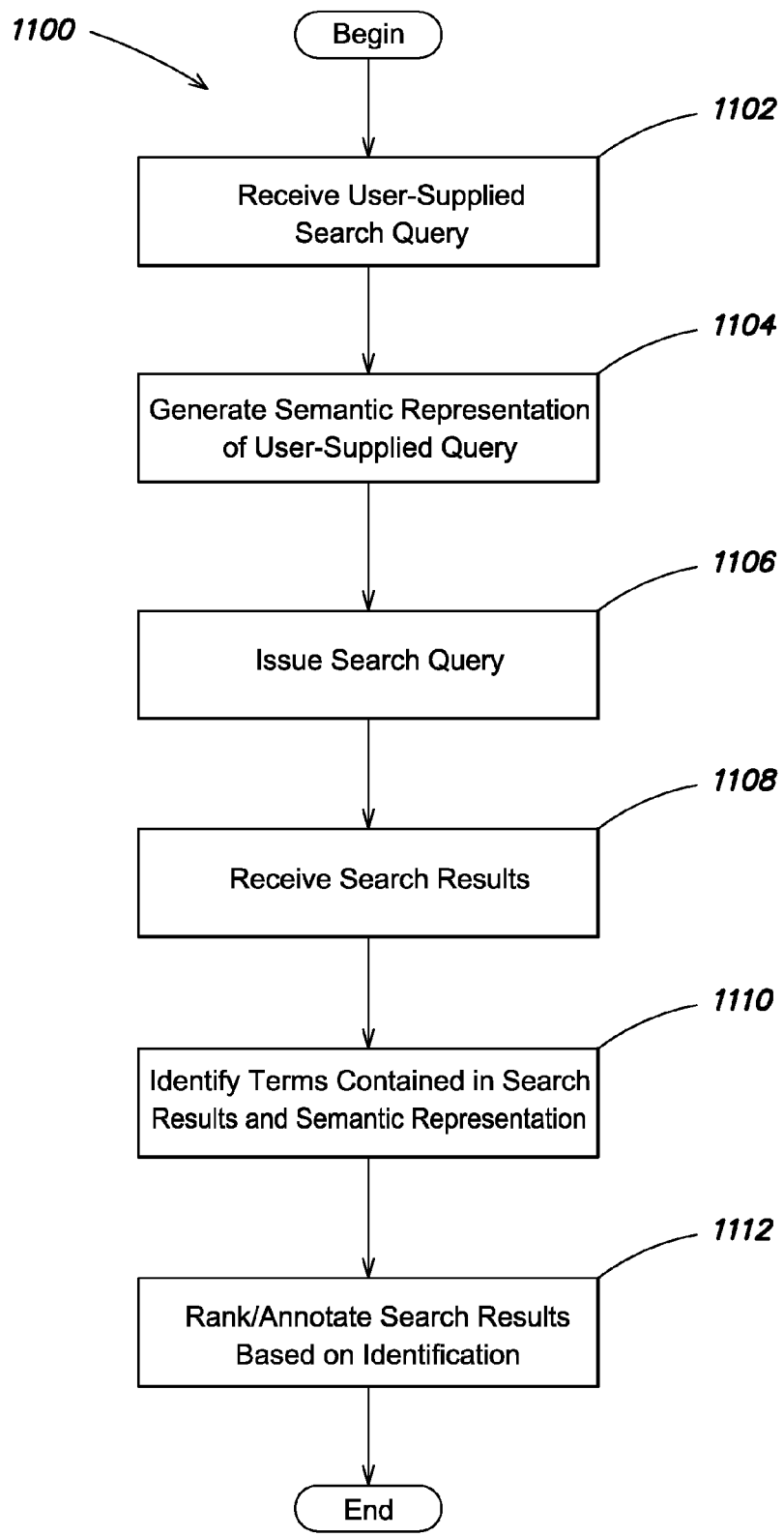
FIG. 11 is a flowchart of an illustrative process for ranking/annotating results, in accordance with some embodiments of the present disclosure.

In addition, in some embodiments, a semantic representation of a user-provided query may be used to rank and/or annotate search results as shown by illustrative process 1100 in FIG. 11. Process 1100 begins in act 1102, where a user-supplied search query is received. The process then continues to act 1104, where a semantic representation of the user's search query is generated. For example, a concept definition representing one possible semantic meaning of the user's query may be generated in act 1104.

The process then continues in act 1106, where the user-supplied search query is issued and the results of the search are received in act 1108. Next, in act 1110, one or more terms are identified such that each of the identified terms is contained both in the search results and in the semantic representation of the user's search query. For instance, textual features provided by search services in their search results may comprise terms also contained in the semantic representation (e.g., a concept definition) of the user's search query.

The process then proceeds to act 1112, where the search results received in act 1108 may be ranked based at least in part on the terms identified in act 1110. The ranking may be performed using any suitable ranking technique as the invention is not limited in this respect. For instance, a search result may be ranked in proportion to the number of terms it shares with the semantic representation of the search query. Additionally or alternatively, the search results may be annotated. For instance, metadata associated with the search results may be annotated with the terms identified in act 1110. After search results are ranked and/or annotated, process 1100 completes.

In some embodiments, the search results returned from the search service may not include the identified pieces of content themselves, but rather may include a list of hyperlinks to these pieces of content along with an except of each piece of content. In such embodiments, rather than retrieving each piece of content using the provided hyperlink, the list of hyperlinks may be filtered and ranked using the associated excerpt, and the excerpt may be semantically annotated.

The semantically annotated content may be provided back to the general content stream (e.g., to a repository of semantically annotated content) such that semantic information in the content may be used in future. Initiatives such as the Semantic Web provide mechanisms for storing and retrieving semantically annotated content.

VII. Displaying Search Results to the User

As discussed above, at act 113 of process 100, once the search results have been filtered and/or ranked, the results may be output (e.g., displayed) to the user. In the illustrative software system 700, act 113 may be performed by user interface module 702. Though, in other embodiments, results may be output to the user by a search service used to obtain the search results. This may be accomplished in any of a variety of possible ways. For example, in some embodiments, the search results may be displayed to the user as web page that includes a list of hyperlinks to the documents or pieces of content in the search results, ordered based on the ranking determined in act 111. The user may access any of the documents or pieces of content by selecting its corresponding hyperlink.

VIII. Extracting New Terms

While in some embodiments, a semantic lexicon (e.g., vocabulary of terms 713) used in generating a semantic representation of a search query (as discussed above in Section II) and in synthesizing an expanded semantic network (as discussed above in Section V) may be static, the inventors have recognized that updating the semantic lexicon by adding new terms to or removing terms from the semantic lexicon may help provide more relevant search results to the user. Further, in an environment of rapidly evolving terms (i.e., keywords) on the real-time Web, extracting terms whose frequency of use has recently increased may allow for ascertaining high-trending terms and/or maintaining a current vocabulary set among other benefits.

In some embodiments, time-stamped content from a network such as the Internet or any other suitable source may be analyzed to identify trends in the term use. For example, blogs (e.g., with time-stamped blog entries) and/or Internet information streams such as real-time Internet streams (e.g., RSS feeds) may be analyzed to identify trends in term usage over a period of time.

Trends in term use may be identified based on term frequency as a function of time. For example, trends in term use may be identified based on a rate of change of the term frequency as a function of time (e.g., based on a derivative, with respect to time, of term frequency as a function of time).

Identifying trends in term use may comprise evaluating a trend score for each term considered. The trend score of a term may be computed based at least in part on the frequency of that term as a function of time. In some embodiments, for each term that appears, the frequency of its appearance may be discounted or decayed as a function of time, so that when terms are new, their trend score may be high, but as terms become mainstream, their trend score may decrease. Because the term frequency may be decayed as a function of time, the term frequency may change as a function of time and may take on different values at any two time instants. As such, the trend score may depend on an "instantaneous" frequency at time t.

Trends in term use may be applied to evaluating the timeliness of a document based on the trend scores of the terms contained within it. Though, it should be recognized that in addition to detecting trends of textual terms based on how often they appear in content (e.g., documents, feeds, etc.), trends of any time-based data may be ascertained. For example, the moments in time of usage interactions, such as when one or a series of individuals click on links within the text material or otherwise signal an intention for content may used to detect trends. Another time-based example where a user signals an intention for content is the time at which a user enters a query and performs a search.

Terms that may have had a high trend score in the past may provide a historical basis for ongoing analysis or inclusion into a controlled vocabulary of terms (e.g., the above-discussed semantic lexicon). The terms can also be evaluated against or otherwise filtered through a controlled vocabulary of terms.

One technique for identifying trends in term usage that may be used in some embodiments is described below. The technique comprises identifying terms in input and calculating a trend score for each term. Evaluating a trend score for each term may comprise evaluating a number of intermediate quantities and, optionally, modifying the value of one or more intermediate quantities based at least in part on a time associated with the term. For instance, the technique may comprise computing a term frequency value for a term and may comprise modifying the term frequency value based on a decay function.

In some embodiments, the time of creation of the text analyzed to identify trendy terms may be known. For example, the text may be time-stamped. As another example, the text may be provided from one or more Internet information streams such that the time at which the feed first emerges may be known. In the illustrative software system of FIG. 7, the identification of trendy terms may be performed by time-based term extraction module 711.

In an input text sample, tokens may be delimited using any of a variety of methods and may be delimited in a language-dependent manner. In languages (e.g., English, French, Spanish, etc.) where words are delimited by spaces, words may be identified by splitting the text based on the whitespace in between words. The Unicode point value may be employed to determine the type of language being analyzed. A Unicode point value is a value is based on a standard for consistent encoding, representing and handling of text expressed in most of the world's writing systems. These values may be used to determine the type of language being analyzed because the length of the strings delimited by whitespaces will vary from language to language, but maintain a degree of consistency within specific categories of language. Thus, if an average Unicode point value for a particular string that was delimited by white spaces exceeds a threshold, this may suggest a language that uses ideograms (e.g., Chinese, Japanese, etc.) Accordingly, the string may be split again into a null string or into individual characters, and the resulting tokens may be processed as words.

Each of the one-word, two-word, three-word and four-words phrases may be scored and, subsequently, ranked based on a trend score. In some embodiments, the ranking may be used to identify a number of terms to add to a semantic lexicon. For example, the highest-ranked terms (e.g., top 1, 5, 10, 100 terms) may be added to the semantic lexicon. In some cases, terms whose trend scores are in a predetermined range (e.g., exceed a predetermined threshold) may be added to the semantic lexicon.

A running count may be maintained for each n-word phrase (i.e., a phrase consisting of n words) based on the total number of occurrences of that phrase in the input text. Thus, for example, the system may maintain a count of the total number of 1-word phrases seen in the input text, a count of the total number of 2-word phrases seen in the input text, a count of the total number of 3-word phrases seen in the input text, and a count of the total number of 4-word phrases seen in the input text. In addition, for each unique phrase, the system may maintain a count of the total number of occurrences of that phrase. For example, if the phrase "patent" has appeared in the input text five-hundred times, the system would maintain a count of five-hundred for that phrase. Similarly, if the phrase "patent application" has appeared in the input text three-hundred times, the system would maintain a count of three-hundred for the phrase.

For each phrase, the system computes a term frequency, which is the total number occurrences of that phrase divided by the total number of phrases of its length. Thus, for example, if the phrase "patent" has appeared in the input text five-hundred times, and the total number of one-word phrases that have appeared in the input text is one million then the term frequency is five hundred divided by one million, or 0.0005. Similarly, if the phrase "patent application" has appeared in the input text three-hundred times, and the total number of two-word phrases that have appeared in the input text is five-hundred thousand, then the term frequency is three-hundred divided by five-hundred thousand, or 0.0006.

The inventors have recognized that when determining term frequency based only on the total counts of phrases, as the counts get larger, new occurrences of a particular phrase have less effect on the term frequency of that phrase. The inventors have recognized that this issue may be addressed by appropriately modifying the total phrase counts and the counts for each unique phrase. In particular, the inventors have appreciated that the total phrase counts and unique phrase counts may each be decayed as a function of time.

The counts may be decayed in any suitable way. In some embodiments, the decay may be defined as a function of the value of a rate-of-decay parameter. The rate-of-decay parameter may indicate an exponential rate of decay. As such, the rate-of-decay parameter may be a half-life parameter. Any suitable half-life value may be used, such as for example 1 day, 2 days, 3 days, 5 days, 1 week, 2 weeks, or any other suitable half-life value. In some embodiments, the value of the half-life parameter may depend on the rate at which new input text is received from Internet feeds supplying the input text.

The decayed term frequency may be computed as the decayed phrase count divided by the decayed total number of phrases. As shown in Table 3, the decayed count at time $t_1$ is equal to the decayed count at time $t_0$ multiplied by e to the power of a constant, k, times $t_1$ minus $t_0$. This formula may be used to obtain the decayed count for a particular phrase and the decayed total count for the total number of phrases.

TABLE 3

$$dc_{t1} = df_{t0} \cdot e^{k(t1-t0)}$$

The constant, k, is determined based on the selected half-life parameter value, and an equation for determining the value of k is shown in Table 4. As shown in Table 4 below, the value of k is the natural log of 0.5 divided by the selected half-life value.

TABLE 4

$$k = \frac{\ln(.5)}{\text{half-life}}$$

In the formula of Table 3, the current decayed count at a particular time is calculated based on the decayed count at an earlier time. However, at the initial time the system is started up, there is no previous decayed count from which to compute the current decayed count. Thus, in some embodiments, the "undecayed" term frequency (i.e., the term frequency computing without decaying any count value) may be used as the value $dc_{t0}$ when computing the first decayed count.

As discussed above, a decayed frequency may be computed from each word using the decayed term count for the word divided by the decayed total number of words. A summed decayed term frequency "SDTF" value may then be computed for each one-word, two-word, three-word, and four-word phrase. The value of SDTF for a phrase is computed by summing the decayed frequencies of all the words in the phrase. Thus, if a phrase has three words, the SDTF for that phrase would be computed by adding together the decayed frequency of the first word in a phrase, the decayed frequency of the second word in the phrase, and the decayed frequency of the third word in the phrase.

Next, a Markov Score is computed for each phrase. The Markov score for multi-word phrases is equal to "innerTF"/ "endsTF." For single-word phrases, the Markov score is equal to 1/"endsTF."

The "ends term frequency" or "endsTF" is the number of unique terms in the input text that precede the first word of the phrase plus the number of unique terms in the input text that follow the last word of the phrase. For example, if a two-word phrase comprises the words $w_1$ and $w_2$, the system would determine how many different words there are in the input text that precedes the word $w_1$ and how many different words there are in the input text that follows the word $w_2$. The value of "endsTF" is the sum of the number of different words there are in the input text that precede the word $w_1$ and the number different words there are in the input text that follows the word $w_2$.

The "inner term frequency" or "innerTF" is determined by dividing the phrase into pairs of words. In this respect, it should be appreciated that one-word phrases do not have an "innerTF" value. For multi-word phrases, pairs are generated by pairing each word in the phrase with the word that precedes it. Thus, for example for a two-word phrase having the words $w_1$ and $w_2$, the only pair generated is ($w_1$, $w_2$). For a three-word phrase having the words $w_1$, $w_2$, and $w_3$, the pairs generated are ($w_1$, $w_2$) and ($w_2$, $w_3$). For a four-word phrase having the words w1, w2, w3, and w4, the pairs generated are ($w_1$, $w_2$), ($w_2$, $w_3$), and ($w_3$, $w_4$). For each pair of words that is generated, the number of times that that pair of word occurs in the input text is determined to generate an occurrence count for each pair of words. The occurrence counts for all of the pairs in the phrase are summed together to generated the value of "innerTF."

Based on the Markov Score for each phrase, a Markov Score Factor (MSF) is computed for each phrase is computed as follows. If the Markov score for a phrase is 0, the MSF for the phrase is generated by multiplying the SDTF for that phrase by a factor. Any suitable factor may be used. In some embodiments, the factor that is used is 2. However, in other embodiments, any factor ranging from 1-100 inclusive may be used. Preferably the factor is less than 10. More preferably, the factor is less than 5.

If the Markov Score for a phrase is not 0, the MSF for the phrase is computed by multiplying the SDTF for the phrase by the Markov Score raised to an exponent, as shown in Table 5 below. The exponent may have suitable value. In some embodiments, the value of the exponent may be 1.5. However, in other embodiments, any value ranging from 1-100 inclusive may be used. Preferably the value is less than 10. More preferably the value is less than 5.

TABLE 5

$$\text{MSF} = \text{SDTF} \times (\text{Markov Score})^{exp}$$

The MSF for each phrase may be used to compute a "Markov Score Factor Long Term Bias" (MSFLTB) value for each phrase as follows. The MSFLTB for a phrase may be computed by dividing the MSF for a phrase by the number of words in the phrase raised to an exponent, as shown in Table 6 below, where n equals the number of words in the phrase for which the MSFLTB is being computed. The exponent may have suitable value. In some embodiments, the value of the exponent may be 2.5. However, in other embodiments, any value ranging from 1-100 inclusive may be used. Preferably the value is less than 10. More preferably the value is less than 5.

TABLE 6

$$\text{MSFLTB} = \frac{\text{MSF}}{n^{exp}}$$

The trend score for a phrase is computed using the formula shown Table 7 below, where df is the decayed term frequency for the phrase, and tc is the average trend count for the phrase (which is computed as described below in connection with Table 8). Exp is a constant that may have any suitable value. In some embodiments, the value of this exponent may be 3. However, in other embodiments, any value ranging from 1-100 inclusive may be used. Preferably the value is less than 10. More preferably the value is less than 5.

The average trend count, tc, for a phrase at time $t_1$ is computed as the weighted sum of the average trend count for the phrase at time $t_0$ and the decayed frequency for the phrase at time $t_1$, as shown in Table 8 below. In the equation shown in Table 8, z is the weighting factor. Any suitable weighting factor may be used. For example, in some embodiments z may have a value of 0.85, though any factor having a value between zero and one, inclusive, may be used.

TABLE 7

MSFLTB $$\left(\left|10 \times \log_{10}\left(\frac{df}{tc}\right)\right|\right)^{exp}$$

TABLE 8

$$tc_{t1} = z \cdot tc_{t0} + (1-z) \cdot df_{t1}$$

Each phrase may be ranked based on its trend score computed using the formula in Table 7, where a lower score is a higher ranking. The top-ranked terms may then be included in the semantic lexicon. For example, the top 15 phrases, or any other suitable portion of the phrases, in the ranking may be included in the semantic lexicon as further discussed below in Section X).

IX. Using Trendy Terms to Identify Concepts Related to an Active Concept

In another aspect of the invention, concepts related to an active concept may be identified from a database of "trendy terms" (i.e., terms whose prevalence or importance, as measured for instance by a trend score, has increased with respect to time) using various approaches. Techniques for identifying trendy terms are described in Section VIII above and as explained in Section V, concepts related to an active concept may be used to enhance and augment the semantic lexicon and/or semantic network.

A reference corpus (e.g., Wikipedia, other encyclopedias, and/or other sources of reference material) is another example of type of source that may be used to identify related concepts. The inventors have recognized that it may be useful to identify related concepts using both a "trendy terms" database and one or more reference corpora. The inventors have further recognized that it may be useful to categorize concepts that are determined to be related to the active concept based on whether they were derived from a trendy terms database or a reference corpus, and to indicate to the user the category of each related concept to the user when presenting the user with the set of related concepts.

Some embodiments are directed to identifying concepts that are related to a source concept, which is referred to herein as an "active concept." In some embodiments, the active concept may be derived from a user-provided search query. As discussed above, in some embodiments, the related concepts that are identified may be presented to a user so that the user may select concepts that may be used to disambiguate or refine the user's search query and, consequently, enable a search engine to present search results that are likely to be more relevant to that for which the user intended to search.

In some embodiments, concepts related to an active concept may be categorized into one of four categories: (1) related concepts identified as being very trendy terms present in real-time data (referred to as "pagecast" category); (2) related concepts identified as being less trendy terms present in real-time data, but not present in any reference corpus (referred-to as "offcast" category); (3) concepts identified from both real-time data and a reference corpus, which may be viewed as being background material (referred to as "recast" category); and (4) concepts identified from a reference corpus, but not from real-time data (referred to as "deepcast" category).

FIG. 8 shows a technique for categorizing related concepts into one of the four above-described categories. As shown in FIG. 8A and FIG. 8B, initially an active concept 801 is compared with a one or more RSS feeds. Each square box numbered 1-12 represents an RSS feed, which is considered to have real-time data 803. Thus, each label in the active concept 801 may be compared to the set of RSS feeds to determine with which RSS feeds it matches. Matching herein means that the RSS feed contains either literal or semantically related terms that are found within the active concept. In the example above, label 1, shown as item 809, from the active concept matches both RSS feed #6 and RSS feed #9 shown as items 805 and item 807 respectively. Though only twelve RSS feeds are shown in FIG. 8C, in practice many more RSS feeds may be analyzed and compared to the labels in an active concept. Related concepts may also be identified from a reference source (e.g., a wiki).

Figure 8A:
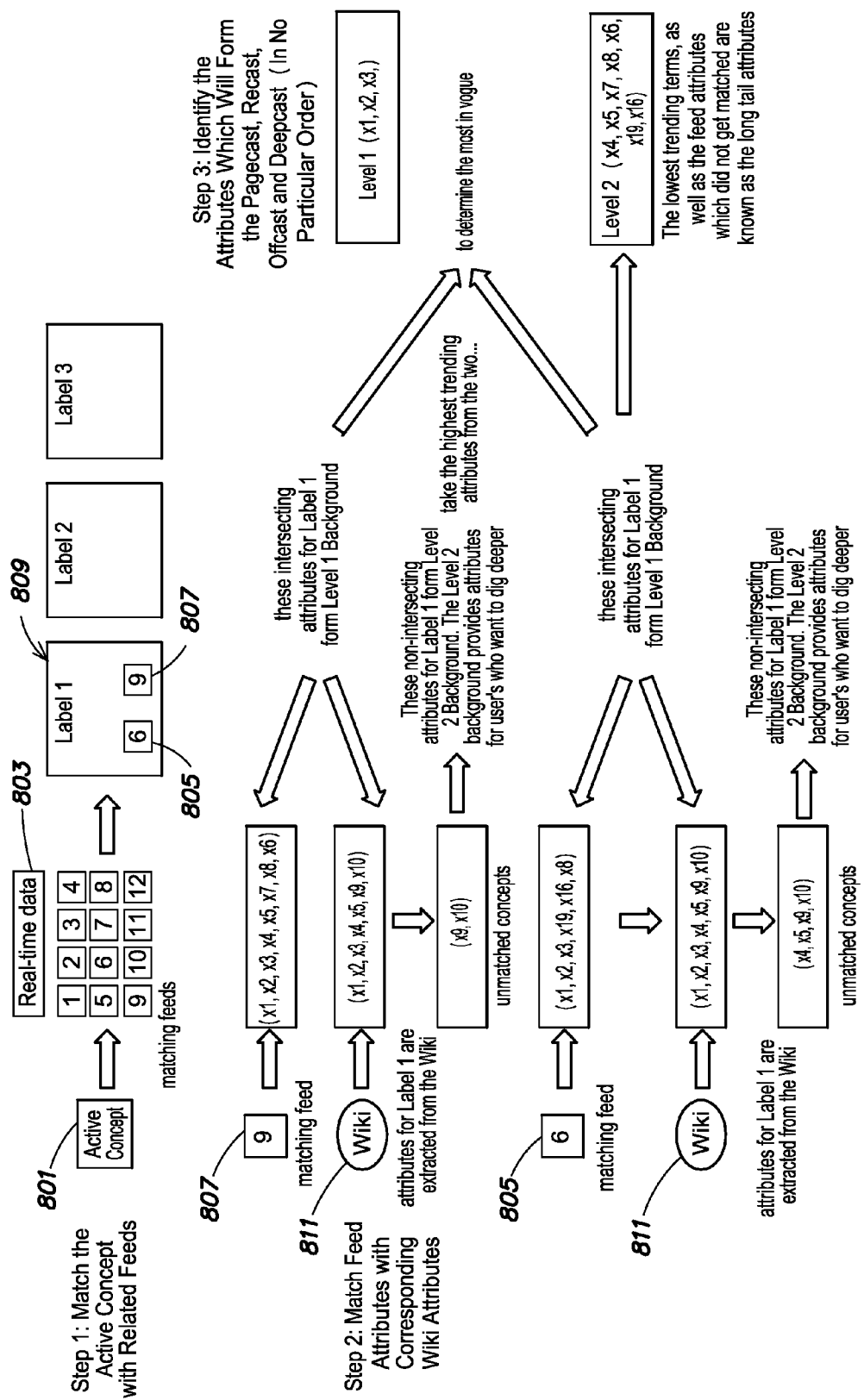
FIGS. 8A-8D are diagrams of an illustrative process for categorizing concepts related to an active concept, in accordance with some embodiments of the present disclosure.
Figure 8B:
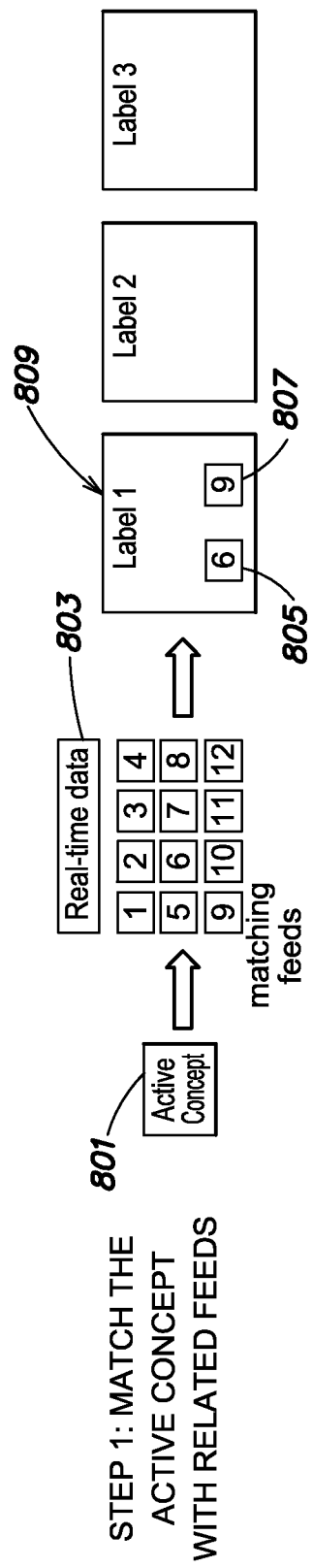
Figure 8C:
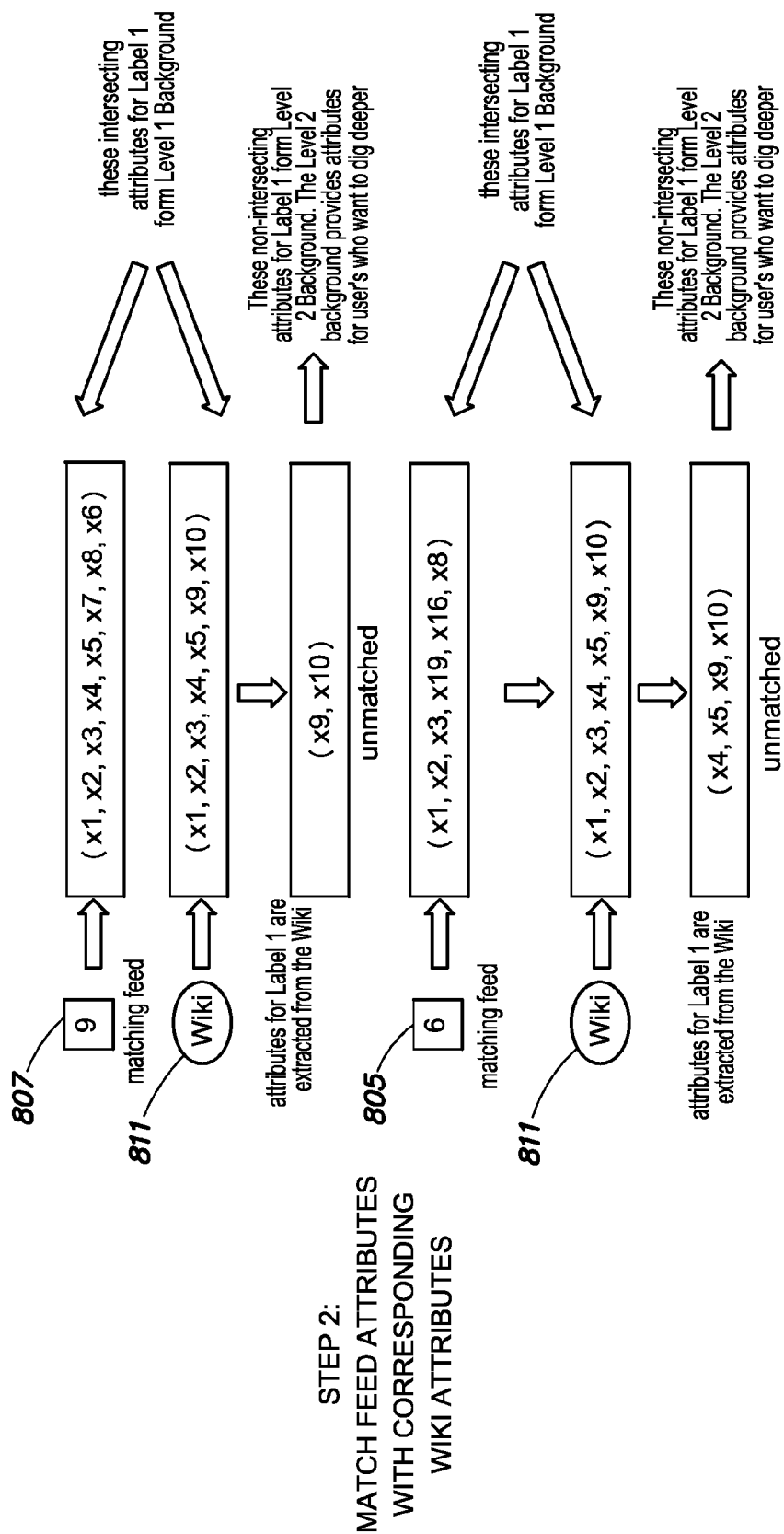

Next, attributes from the matching RSS feeds may be compared to attributes from the related concepts identified from the reference source. For example, as shown in FIG. 8A and FIG. 8C, attributes from RSS feed #9, shown as item 807, are compared with attributes obtained from Wiki 811 (i.e., the reference corpus). Similarly, attributes from RSS feed #6 shown as item 805 are compared with attributes from the Wiki 811.

As shown in FIG. 8C, attributes x1, x2, x3, x4, and x5 are present in both a matching RSS feed and the Wiki 811. Thus, these attributes may be deemed to be related concepts that are derived from real-time data (e.g., an RSS feed) and a reference corpus (e.g., the wiki), and may be categorized into category (3) discussed above. Attributes x9 and x10 are present only in the Wiki 811, and not in any RSS feed, and thus may be categorized in category (4) discussed above.

Figure 8D:
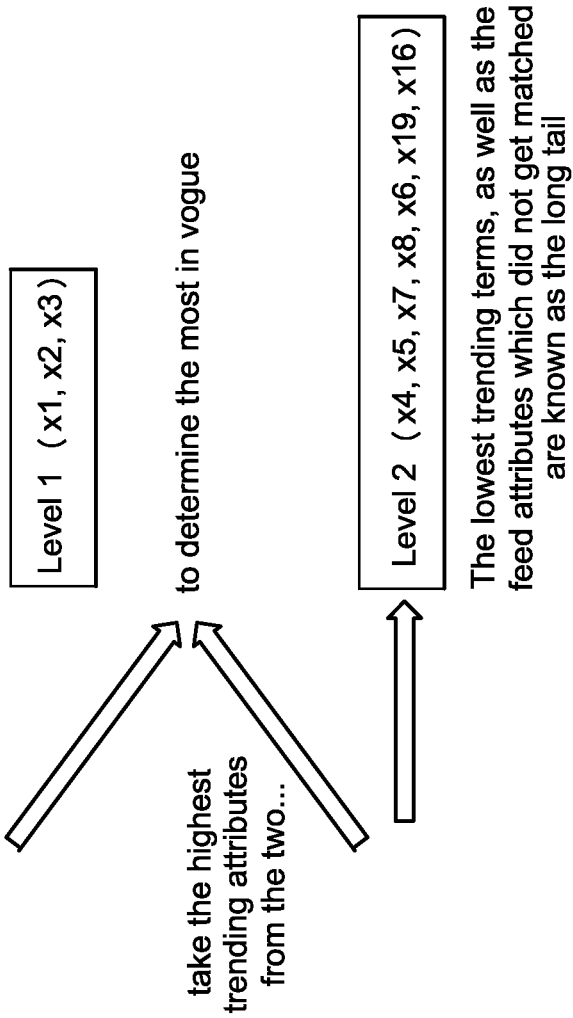

Attributes x6, x7, x8, x19, and x16 are present only in a matching RSS feeds, but not in the reference corpus. These attributes may be categorized into either category (1) or category (2) depending on whether they are deemed to be highly trendy terms or not. Terms may be determined to be trendy or not using the trendiness evaluation methods discussed in Section VIII above. Terms that are highest trending and in vogue then may form a first level of terms, while less trendy and non-intersecting terms may form a second level, as shown in FIG. 8D.

Another example is provided below, using "Green Technology" as an illustrative active concept. First, the active concept is compared to the one or more RSS feeds 803 to determine which RSS feeds matches the active concept. The active concepts may match the following three RSS feeds:

Feed 1: EcoSeed at www.ecoseed.org (solar panels, energy devolatization system, algae biofuel, sustainable biomass power, hydropower, electric car, geothermal)

Feed 2: Green Progress at www.greenprogress.com (solar panels, electric car, wind farm, hydrogen fuel cells, geothermal, algae biofuel, sustainable gypsum board)

Feed 3: Eco Friend at www.ecofriendsnews.com (wind farm, solar panels, solar hot water heater, biomass heating system, Aurora algae biodiesel, tidal energy, waste heat engine)

The words in parentheses are words that are present in the RSS feed. Next, the related attributes from a reference corpus (e.g., a wiki) are obtained, and matched with attributes of the identified RSS feeds. Continuing the example, en.wikipedia.org/wiki/Environmental_Technology, the "Green Technology" Wikipedia entry, is used as a reference corpus. As shown below, the terms "solar panels," "biomass," and "electric car" are present in both Feed 1 and the Wiki. The terms "solar panels," "electric car," and "hydrogen fuel cells," are present in both Feed 2 and the Wiki. The terms "solar panels," and "biomass" are present in both Feed 3 and the Wiki.

Feed 1: EcoSeed (solar panels, energy devolatization system, algae biofuel, sustainable biomass power, hydropower, electric car, geothermal)

Wiki: Green Technology (solar panels, electric car, air purification, water purification, solid waste management, hydrogen fuel cells, biofiltration, desalination, biomass)

Feed 2: Green Progress (solar panels, electric car, wind farm, hydrogen fuel cells, geothermal, algae biofuel, sustainable gypsum board)

Wiki: Green Technology (solar panels, electric car, air purification, water purification, solid waste management, hydrogen fuel cells, biofiltration, desalination, biomass)

Feed 3: Eco Friend (wind farm, solar panels, solar hot water heater, biomass heating system, Aurora algae biodiesel, tidal energy, waste heat engine)

Wiki: Green Technology (solar panels, electric car, air purification, water purification, solid waste management, hydrogen fuel cells, biofiltration, desalination, biomass)

Next, the attributes belonging to each of the four categories are identified. Because the terms "solar panels," "electric car," "biomass," and "hydrogen fuel cells" are present in both the wiki and the real-time feeds, they are categorized into category (3) (i.e., the "recast" category).

Matching Attributes from the three feeds:

Feed 1: EcoSeed AND Wiki: Green Technology (solar panels, electric car, biomass)

Feed 2: Green Progress AND Wiki: Green Technology (solar panels, electric car, hydrogen fuel cells)

Feed 3: Eco Friend AND Wiki: Green Technology (solar panels, biomass)

In this example, "solar panels" may be deemed a very trendy term by virtue of the fact that each of this term is present in all three matching feeds. However, the techniques described in Section VIII above for determining which terms are very "trendy" may also be used. Deeming "solar panels" as a very trendy term may allow this term to be recategorized from category (3), i.e. the "recast" category into category (1), i.e., the "pagecast" category.

The feed attributes that were either low trending and/or not matched to any attributes in the Wiki (i.e., energy devolatization system, algae biofuel, hydropower, geothermal, wind farm, sustainable gypsum board, solar hot water heater, biomass heating system, Aurora algae biodiesel, tidal energy, waste heat engine) may be categorized into category (2), i.e., the "offcast" category.

The attributes from the Wiki that were not present in any of the RSS feeds (i.e., air purification, water purification, solid waste management, biofiltration, desalination) may be categorized into category, (4), i.e., the "deepcast" category.

X. Updating the Semantic Lexicon

While in some embodiments, the semantic lexicon used in generating a semantic representation of a search query (as discussed above in Section II) and in synthesizing an expanded semantic network (as discussed above in Section V) may be static, the inventors have recognized that updating the semantic lexicon with new terms may be beneficial in dynamic content environments where both the content and the terms used to describe the content are rapidly changing. Thus, in some embodiments, the semantic lexicon (e.g., the vocabulary of terms 713 shown in FIG. 7) may be updated to include the terms identified as "trendy" using the extraction techniques discussed above in Section VIII.

New terms or phrases may be extracted through any number of information extraction techniques (for example, as discussed above in Section VIII) and added to the semantic lexicon in any of a variety of ways. For example, for each term or phrase to be included in the semantic lexicon, intersecting whole or partial words may be identified in the semantic lexicon. Relationships between the phrase and the related words may be formed in the semantic lexicon (for example, using semantic synthesis operations as discussed above in Section V). In some embodiments, relationships may be formed between phrases that are being added to the semantic lexicon that occurred in the same document or came from the same Internet information stream.

XI. Monetization Using Trendy Terms Method

Another aspect of this invention relates to the fact that Internet advertising has become a common way for a business to promote the products and/or services that it offers. Some Internet search engines and other WWW sites allow an advertiser to bid on keywords, such that when a search engine user provides a search query to the search engine that includes the keywords bid on by the advertiser, the advertiser's advertisement is displayed as part of or in addition to the search results returned by the search engine. The frequency with which the advertiser's advertisement is displayed in response to a search query that includes the keywords, and the location of the advertiser's advertisements relative to other advertisements on the web page having the search results, depend on the amount of money that the advertiser has bid on the keywords relative to the amounts of other advertisers' bids on those keywords.

The inventors have recognized that, for an advertiser, effectively selecting on which keywords to bid is an important factor affecting the success of an advertising campaign. The inventors have appreciated that bidding on "trendy terms" (i.e., words or phrases that are frequently used) can increase the effectiveness of an advertising campaign. In addition, the inventors have recognized that the ability to predict which terms are increasing in frequency of use prior to those terms reaching their peak popularity and to predict when popular terms will decrease in popularity may be beneficial. Such predictions may be useful to advertisers in determining when to increase or decrease bid amounts on keywords and/or when to bid on new keywords or cease bidding on particular keywords.

The inventors have developed a technique that evaluates terms based on two different measures of "trendiness," and assigns a term to one of four available categories based on these two measures.

Figure 9:
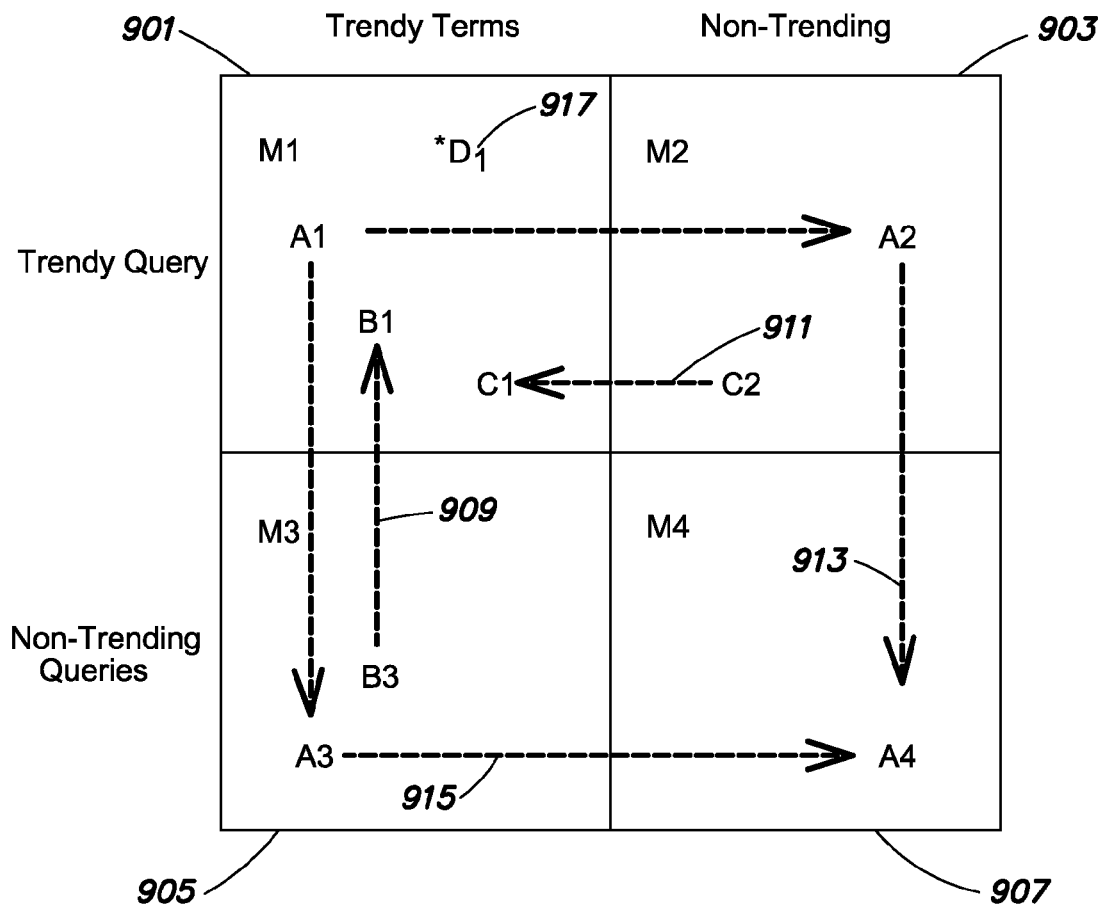
FIG. 9 is a diagram of an illustrative matrix of monetization categories, in accordance with some embodiments of the present disclosure.

FIG. 9 shows a matrix with two rows and two columns. As such, this matrix has four cells, and each of these cells corresponds to one of the four available categories into which a term may be categorized. These four categories are shown in FIG. 9 as: category M1 901; category M2 903; category M3 905; and category M4 907. Each term may be categorized into one of the columns of the matrix based on the "trendiness" of the term in content that is published and publicly accessible on the Internet (e.g., in blogs, Internet publications, RSS feeds, and the like). Each term is categorized into one of the rows of the matrix based on the "trendiness" of the term in search queries issued by users of a search engine. Techniques for tracking the trendiness of a term over time are described Section VIII above.

Thus, each term may be assigned a first trend score based on the trendiness of the term in content that is published and publicly accessible on the Internet. If this first trend score meets or exceeds a first predefined threshold, the term may be categorized into the left column of the matrix, whereas if the trend score is below the first threshold, the term may be categorized in the right column of the matrix.

Each term may also be assigned a second trend score based on the trendiness of the term in user-issued search queries. If this second trend score meets or exceeds a second predefined threshold, the term may be categorized into the top row of the matrix, whereas if the trend score is below the second threshold, the term may be categorized into the bottom row of the matrix. In this way, each term may be categorized into one of the four cells, and hence one of the four categories.

Terms that fall into M1 901 are of interest because there is a large amount of content being published on that term and there is a large amount of interest about the term, as evidence by the trendiness of the user-query. Terms that fall into M2 903 are of interest because there is a large amount of interest in the term (i.e. people are asking about that topic through queries), but there is little being spoken to about that term (i.e. that term is trending low in content and, thus, there is little new knowledge being created with respect to that term.) Thus, terms falling into M2 903 may represent terms to which curiosity is going unanswered. Terms that fall into M3 item 905 are of interest because, while few people may be little current interest about the term (i.e. people are not asking about that topic through queries), there is a great deal being spoken to about that term (i.e. that term is trending in content and, thus, there's is a large amount of new knowledge being created with respect to that term). Terms that fall into M4 may be of least interest, as they are neither being asked about nor is there new knowledge being created with respect to these terms. As will be explained, not only the current quadrant where a term resides may be of interest, but also the quadrant towards which the term is moving and the amount of time it will take to traverse such a path may be ascertained and be of interest.

Terms categorized into category M1 901, that are trendy in both content published on the Internet and in user-issued search queries, may be considered the most monetizable and the best terms to be bid on by advertisers. Terms categorized into category M2 903, that are not considered to be trendy in content published on the Internet but are trendy in user-issued search queries, may be considered to be the second-best for monetization and also desirable for advertisers to bid on. Terms that may fall into the M2 category 903 are terms that may relate to events that have occurred some time ago. For example, in January of 2011 the term "2010 FIFA World Cup" may not be considered trendy in content that is published on the Internet because not very much new content about the 2010 FIFA World Cup is being written. However, there may be still be a lot of user-issued search queries for this term because there may be a large number of users who want to know what happened at that event.

Terms categorized in the M3 category 905 may be considered the third-best terms for monetization, but less desirable to be bid on by advertisers because they are not as frequently used in user-issued search queries. Examples of terms that fall into this category are terms that relate to current events that are not of high interest to the general population. While the frequency of use of these terms in published content on the Internet may have increased greatly because of the occurrence of the event, there may not be many user-issued search queries about the event because there is little interest in it.

Terms categorized in the M4 907, that are not trendy in content published on the Internet and are not being frequently used in user-issued search queries, may be of the least interest to advertisers. A term may shift quadrant by the day, hour, minute or second, and bidding for such terms may react accordingly on the same time scale.

The category into which a term is categorized may change over time as that term falls in and out of vogue. The trendiness of terms over time may be tracked and the past changes in trend scores for terms may be used to predict future changes in the trend scores for these terms.

Item 909 in FIG. 9 shows the movement of a term from position B3 to position B1. The term initially was non-trending as a query when at position B3, and subsequently moved to position B1, the zone of a trending query. Approaches that may support ascertaining trendiness may be found in related U.S. patent application Ser. No. 12/555,222, 12/555,293 and 12/555,341, each of which are fully incorporated by reference in this application. Further, these applications may be used to pre-process promoted/non-promoted content. Similarly approaches can be used to predict the approximate lag time over the course of item 911, denoting a move from position C2 where a term that is trending as query but not in content into position C1 where the term is trending in both.

Item 915 identifies a position of a term moving from A1 to A3 to A4, where a term initially becomes less trendy, and then subsequently the term decreases in trendiness as both a query and as content. Item 913 identifies a term moving from A1 to A2 to A4, where the term is fading away as a trending term and then as a query. When the term has departed from quadrant M1 or M2, the term is of less interest and may ceased to be tracked in order to conserve memory and processing resources. Data processing methods outlined in U.S. patent application Ser. Nos. 12/555,222, 12/555,293 and 12/555,341 may be used in performing such steps.

The inventors have further recognized that an automated software program, referred to herein as a "bot" may be used to automatically take some action in response to a term being initially categorized into one of the above-discussed categories or being re-categorized into a different category.

For example, in response to a term being categorized into category M1 901, the bot may automatically deposit promotional content for the term. A bot may deposit promotional content in a variety of different ways. For example, the bot may directly carry ads with a concept that is trending in published content or user-queries. Such an ad is more likely to be relevant based on the trendiness of the term to which is directed, and may be presented on a third-party sites in the form of a "banner" ad. The bot may additionally or alternatively deliver information about which terms are valuable for monetization to search engine operators, so that these search engine operators may suggest to advertisers effective keywords that might be desirable for those advertisers to bid on. Further, the bot may automatically purchase trendy keywords from search engines or other ad exchanges.

Because, in some embodiments, it may be possible to predict the time at which a term is at its peak popularity (e.g., when a term will transition to category M1 901 from another one of the categories), the bot can use this information to determine at what point it is best to bid on a particular keyword. That is, based on the calculation of the lag time or the length of time it takes from a term to go from one cell (i.e. M1, M2, M3 or M4) in FIG. 9 to any other cell in FIG. 9. For example, if it is determined that a term will peak in trendiness in approximately 2 days, the bot may purchase keywords or arrange for advertisements to be displayed in 2 days. Thus, this approach enables capitalizing upon trendy terms not only in real time but also in advance by being able to calculate the most popular and the most queried terms or concepts before their popularity rises and/or peaks.

Similarly, because a decrease in the trendiness of a term can also be predicted, the bot may use information about when a decrease in trendiness of a term is predicted to occur, to automatically reduce or eliminate bids on keywords related to the term, to stop display of previously-purchased advertisements related to the term.

Figure 10:
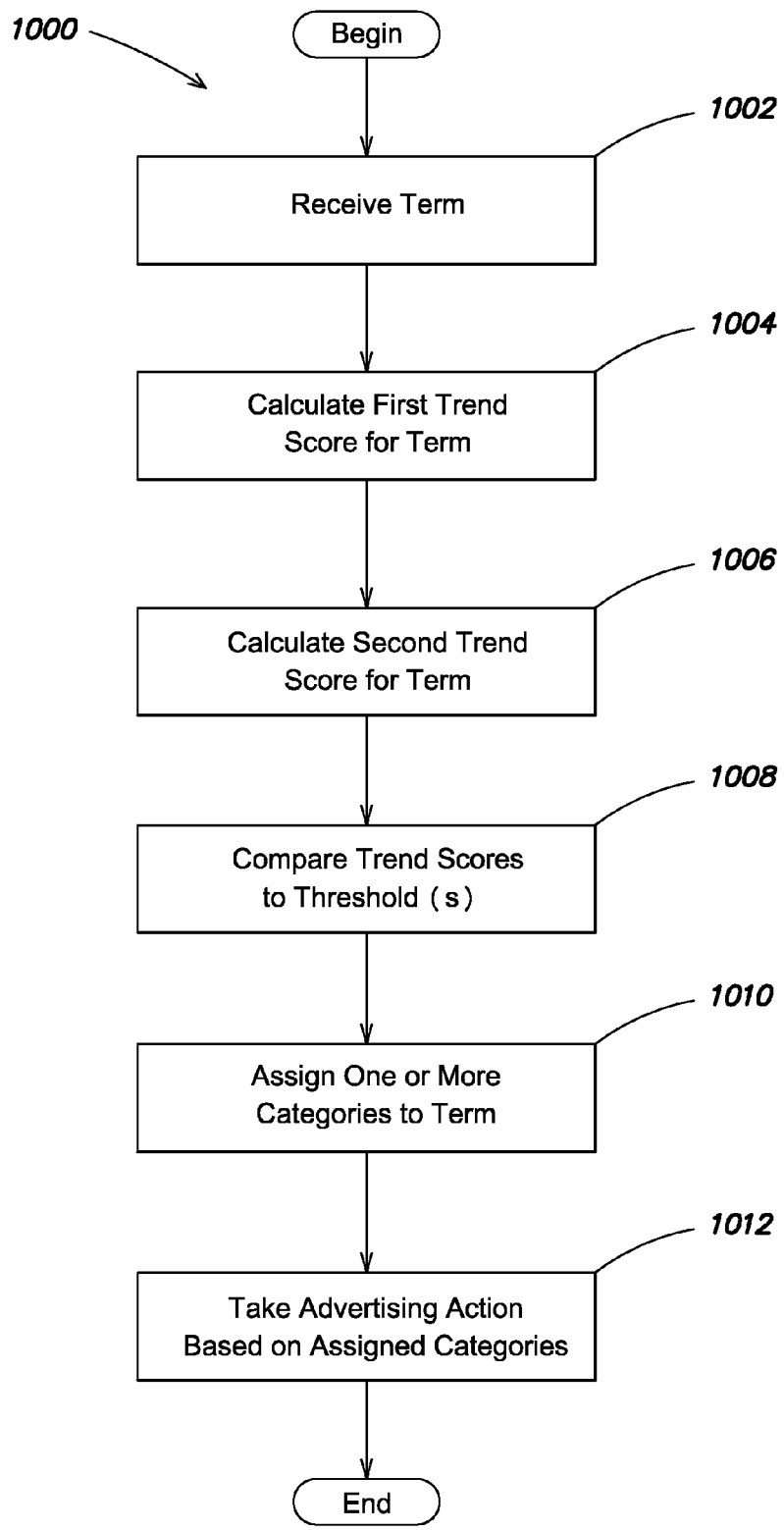
FIG. 10 is a flowchart of an illustrative process for taking an advertising action, in accordance with some embodiments of the present disclosure.

FIG. 10 is a flowchart of an illustrative process 1000 for taking an advertising action that may be used in some embodiments. Process 1000 begins in act 1002, where a term is received. The term may be a term that appears in a body of information content and may be received in any suitable way. The body of information content may comprise any suitable information content and, for example, may comprise published Internet content and/or one or more user-issued search queries. After receiving the term, the process continues to acts 1004 and 1006 where a first and a second trend score is calculated for the received term, respectively. The first trend score may be a trend score calculated based at least in part on the frequency of appearance of the term in published Internet content. The second trend score may be calculated based at least in part on the frequency of appearance of the term in one or more user-issued queries. The trend scores may be computed by using techniques discussed above in Section VIII.

The process then continues in act 1008, where the first and second trend scores are compared to one or more thresholds. For instance, the first trend score may be compared to a first predefined threshold and the second trend score may be compared to a second predefined threshold. The process may determine, as part of the comparisons, if the first trend score exceeds the first predefined threshold and whether the second trend score exceeds the second predefined threshold. Based on the result of the comparisons the term may be categorized into one or more of a plurality of monetization categories in act 1010.

The process then continues in act 1012, where an advertising action may be taken based on the one or more categories into which the term is categorized. The advertising action may be any suitable advertising action associated with the term and its monetization categories. For example, the advertising action may comprise predicting a time at which to purchase the term from a search engine or ad exchange, purchasing the term from the search engine or the ad exchange, and/or suggesting, implicitly or explicitly, the term as an effective term for an advertiser to purchase from the search engine or the ad exchange. After an advertising action is taken, process 1000 completes.

XII. Additional Implementation Detail

Figure 6:
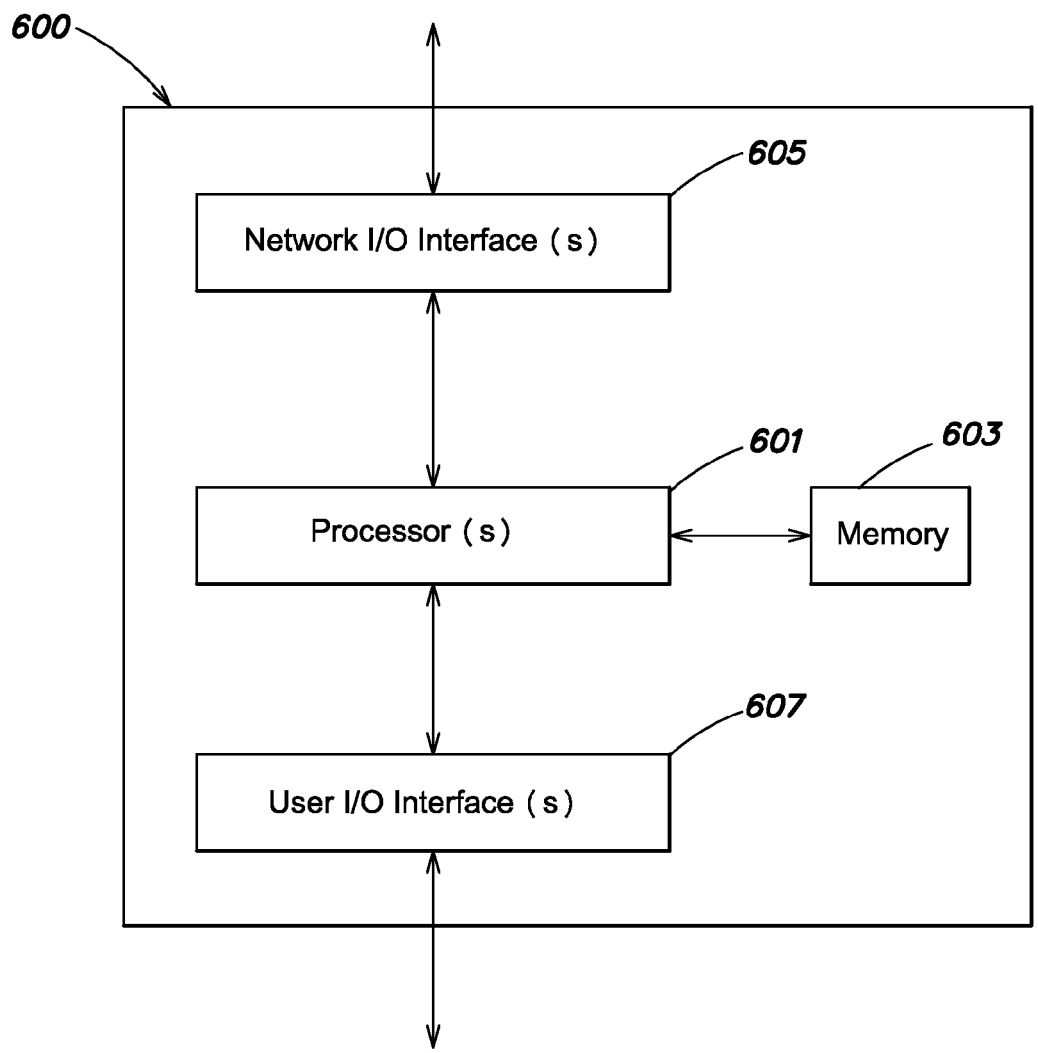
FIG. 6 is a block diagram of a computing device on which some embodiments of the present disclosure may be implemented.

The above discussed computing devices (e.g., client computer and server shown in FIGS. 2 and 4) may be implemented in any of a variety of ways. FIG. 6 is a block diagram an illustrative computing device 600 that may be used to implement any of the above-discussed computing devices.

The computing device 600 may include one or more processors 601 and one or more tangible, non-transitory computer-readable storage media (e.g., memory 603). Memory 603 may store, in tangible non-transitory computer-readable storage media computer instructions that implement any of the above-described functionality. Processor(s) 601 may be coupled to memory 603 and may execute such computer instructions to cause the functionality to be realized and performed. Computing device 600 may also include a network input/output (I/O) interface 605 via which the computing device may communicate with other computers (e.g., over a network). In some embodiments, the computing device may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code may be embodied as stored program instructions that may be executed on any suitable processor or collection of processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smart phone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory computer-readable storage media articles in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments, or vice versa.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method comprising:
using at least one processor to perform:
receiving a first search query;
obtaining a disambiguation term for semantically disambiguating the first search query, the obtaining comprising: presenting a plurality of terms in one or more semantic representations of the first search query to a user; and
receiving user input identifying the disambiguation term in the plurality of terms;
after obtaining the disambiguation term,
generating a semantic network comprising a hierarchy of concepts related to a first semantic representation identified based on the disambiguation term, the one or more semantic representations comprising the first semantic representation, and
generating a second search query based at least in part on the first search query and at least one concept in the hierarchy of concepts in the generated semantic network; and
outputting search results obtained from a search conducted based, at least in part, on the second search query.

2. The method of claim 1, further comprising:
ranking the search results, filtering the search results, or ranking and filtering the search results.

3. The method of claim 1, wherein obtaining the disambiguation term further comprises:
generating the one or more semantic representations of the first search query using a semantic lexicon.

4. The method of claim 3, further comprising:
adding terms to the semantic lexicon, removing terms from the semantic lexicon, or adding and removing terms from the semantic lexicon.

5. The method of claim 4, further comprising adding to the semantic lexicon terms obtained from a real-time Internet information stream.

6. The method of claim 1, wherein generating the second search query comprises:
identifying the first semantic representation of the first search query based on the disambiguation term.

7. The method of claim 1, further comprising:
identifying terms appearing in a body of information content with a trend score higher than a predetermined threshold; and
generating the semantic network further based on the identified terms.

8. The method of claim 6, further comprising:
annotating the search results based on the semantic network.

9. The method of claim 1, wherein outputting the search results from the search based at least in part on the second search query comprises:
sending the second search query to a search service to conduct the search; and
in response, receiving the search results from the search service.

10. The method of claim 1, wherein outputting the search results further comprises:
displaying the search results to a user.

11. A system, comprising:
at least one hardware processor configured to perform:
receiving a first search query;
obtaining a disambiguation term for semantically disambiguating the first search query, the obtaining comprising:
presenting a plurality of terms in one or more semantic representations of the first search query to a user; and
receiving user input identifying the disambiguation term in the plurality of terms;
after obtaining the disambiguation term,
generating a semantic network comprising a hierarchy of concepts related to a first semantic representation identified based on the disambiguation term, the one or more semantic representations comprising the first semantic representation, and
generating a second search query based at least in part on the first search query and at least one concept in the hierarchy of concepts in the generated semantic network; and
outputting search results obtained from a search conducted based, at least in part, on the second search query.

12. At least one non-transitory computer-readable storage medium storing processor-executable instructions that, when executed by at least one processor, cause the at least one processor to perform a method comprising:
receiving a first search query;
obtaining a disambiguation term for semantically disambiguating the first search query, the obtaining comprising:
presenting a plurality of terms in one or more semantic representations of the first search query to a user; and
receiving user input identifying the disambiguation term in the plurality of terms;
after obtaining the disambiguation term,
generating a semantic network comprising a hierarchy of concepts related to a first semantic representation identified based on the disambiguation term, the one or more semantic representations comprising the first semantic representation, and
generating a second search query based at least in part on the first search query and at least one concept in the hierarchy of concepts in the generated semantic network; and
outputting search results obtained from a search conducted based, at least in part, on the second search query.

* * * * *